United States Patent [19]
Hirabayashi et al.

[11] Patent Number: 6,065,353
[45] Date of Patent: May 23, 2000

[54] PIEZOELECTRIC LOAD SENSOR, AND PROCESS FOR DETECTING LOAD-APPLIED POSITION

[75] Inventors: Yusuke Hirabayashi; Masahiro Ohta, both of Saitama, Japan

[73] Assignee: Honda Giken Kogyo Kabushiki Kaisha, Tokyo, Japan

[21] Appl. No.: 09/108,316

[22] Filed: Jul. 1, 1998

[30] Foreign Application Priority Data

Jul. 3, 1997 [JP] Japan .................................. 9-178541

[51] Int. Cl.[7] ....................................................... G01L 1/16
[52] U.S. Cl. ............................................ 73/862.68; 73/777
[58] Field of Search ........................ 73/777, 780, 862.68, 73/721, 727, 514.34; 310/363, 367; 367/157

[56] References Cited

U.S. PATENT DOCUMENTS

| | | | |
|---|---|---|---|
| 4,841,494 | 6/1989 | Banno | 367/157 |
| 5,195,046 | 3/1993 | Gerardi et al. | 702/35 |
| 5,288,551 | 2/1994 | Sato et al. | 428/334 |
| 5,377,547 | 1/1995 | Kusakabe et al. | 73/723 |
| 5,504,388 | 4/1996 | Kimura et al. | 310/363 |

FOREIGN PATENT DOCUMENTS 62-297735  12/1987  Japan .
10-142084   5/1998  Japan .

*Primary Examiner*—Max Noori
*Attorney, Agent, or Firm*—Arent, Fox Kintner Plotkin & Kahn

[57] ABSTRACT

A piezoelectric load sensor includes a plurality of upper piezoelectric elements interposed between upper and intermediate conductors and arranged in a row. A plurality of lower piezoelectric elements are interposed between lower and intermediate conductors and arranged in a row. The upper piezoelectric elements have their piezoelectric constants set so that they gradually decrease from the piezoelectric element located at one end in a direction of arrangement of the upper piezoelectric elements toward the piezoelectric element located at the other end in the direction of arrangement. The lower piezoelectric elements have their piezoelectric constants set so that they gradually increase from the piezoelectric element located at one end in a direction of arrangement of the lower piezoelectric elements toward the piezoelectric element located at the other end in the direction of arrangement. Thus, a load-applied position can be detected from a ratio of voltages generated by one set of the upper and lower piezoelectric elements.

13 Claims, 19 Drawing Sheets

FIG.13
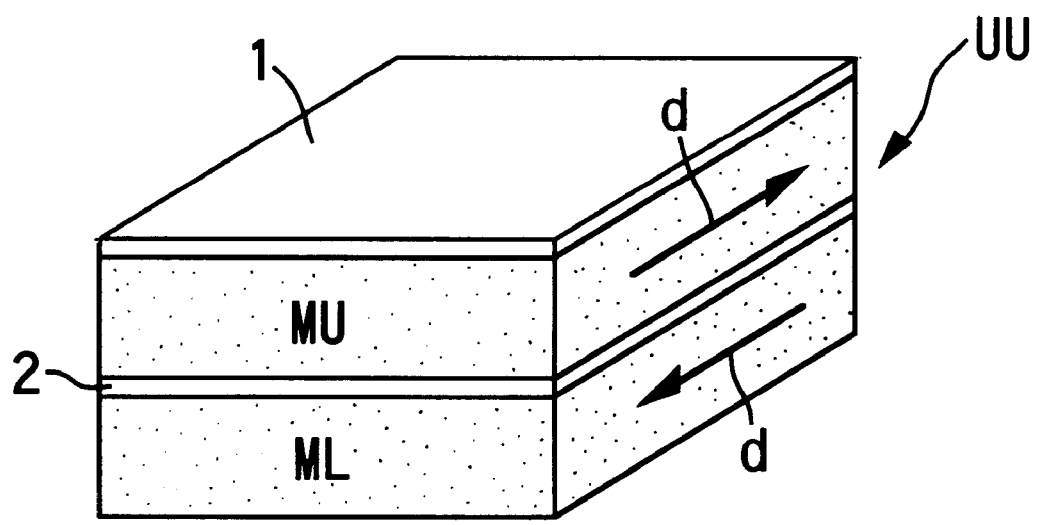
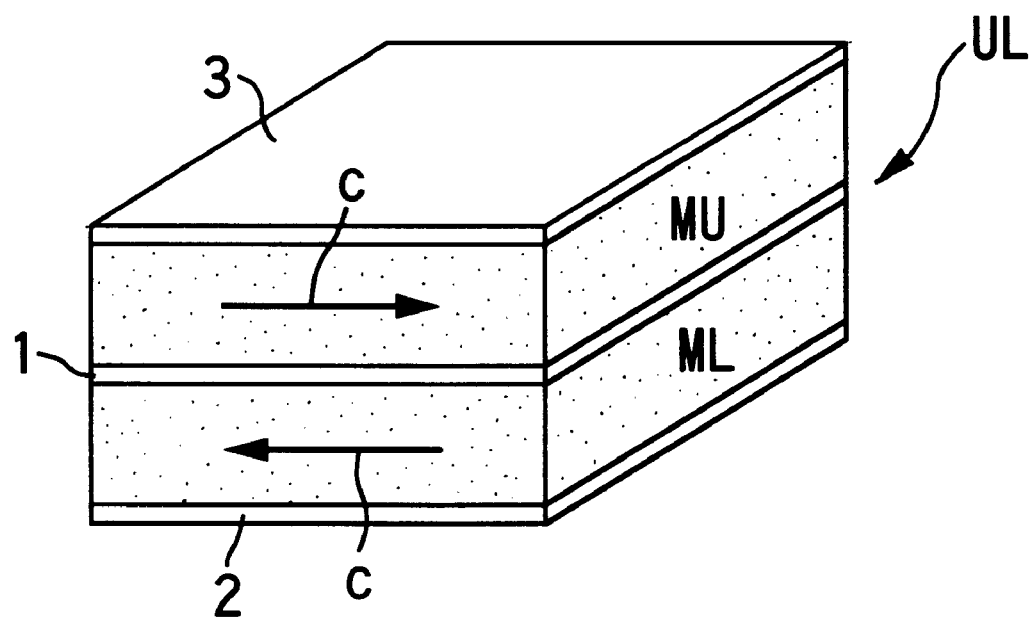

6,065,353

PIEZOELECTRIC LOAD SENSOR, AND PROCESS FOR DETECTING LOAD-APPLIED POSITION

BACKGROUND OF THE INVENTION

1. Field of the Invention

The present invention relates to a piezoelectric load sensor, and a process for detecting a load-applied position using such a piezoelectric load sensor.

2. Description of the Related Art

A conventionally known piezoelectric type pressure-distributed load sensor is disclosed in Japanese Patent Application Laid-open No. 62-297735.

However, the known load sensor suffers from the following problems: The load sensor is designed so that for each of the piezoelectric elements, a signal generated by each piezoelectric element is detected. Hence, a complicated signal treating mechanism is required. In addition, in order to detect the piezoelectric element to which a load is applied, the number of detecting operations which must be carried out corresponds to the number of piezoelectric elements. Hence, the detecting operations are complicated, and the detecting speed is low.

SUMMARY OF THE INVENTION

Accordingly, it is an object of the present invention to provide a piezoelectric load sensor of the above-described type which has a simple structure and which can be made at a reduced cost, wherein the number of physical quantities to be measured can be decreased. Thus, the detection of the load-applied position and the detection of the load can be rapidly carried out without needing a complicated signal treating mechanism.

To achieve the above object, according to the present invention, there is provided a piezoelectric load sensor comprising an upper conductor, a lower conductor, an intermediate conductor located between the upper and lower conductors, a plurality of upper piezoelectric elements interposed between the upper and intermediate conductors and arranged in a row, and a plurality of lower piezoelectric elements interposed between the lower and intermediate conductors and arranged in a row. The piezoelectric constants of the plurality of upper piezoelectric elements are set so that they gradually decrease from the piezoelectric element located at one end in a direction of arrangement toward the piezoelectric element located at the other end in the direction of arrangement. The piezoelectric constants of the plurality of lower piezoelectric elements are set so that they gradually increase from the piezoelectric element located at one end in the direction of arrangement toward the piezoelectric element located at the other end in the direction of arrangement.

With the above arrangement, if the sum of electrostatic capacities of all the upper piezoelectric elements is represented by CU, and the sum of electrostatic capacities of all the lower piezoelectric elements is represented by CL and for example, if it is supposed that a load T is applied to the n-th upper and lower piezoelectric elements from the one end in the direction of arrangement, a voltage $VU_n$ generated by the n-th upper piezoelectric element and a voltage $VL_n$ generated by the n-th lower piezoelectric element are represented by the following equations:

$$VU_n = (dU_n/CU) \cdot T$$

$$VL_n = (dL_n/CL) \cdot T$$

$$\therefore VU_n \cdot (CU/dU_n) = VL_n \cdot (CL/dL_n)$$

$$\therefore VU_n/VL_n = (CL \cdot dU_n)/(CU \cdot dL_n)$$

wherein $dU_n$ and $dL_n$ are piezoelectric constants of the upper and lower piezoelectric elements.

In this case, $dU_n$ is a gradually decreased value, while $dL_n$ is a gradually increased value. Therefore, $VU_n/VL_n$ is a gradually decreased value. Namely, the ratio of both the voltages is different for every group where each group comprises one upper piezoelectric element and one lower piezoelectric element opposed to the upper piezoelectric element. Therefore, if a theoretic voltage ratio $VU_n/VL_n$ is previously determined from the piezoelectric constants $dU_n$ and $dL_n$ and the sum CU and CL of the electrostatic capacities which are known values as characteristics of the piezoelectric elements, a load which is applied to the position of the n-th upper piezoelectric element can be detected by comparing the theoretic voltage ratio $VU_n/VL_n$ with the voltage ratio $VU_n/VL_n$ calculated from the generated voltages measured.

On the other hand, from the above-described equations, $$T = VL_n \cdot (CL/dL_n)$$

$$T = VU_n \cdot (CU/dU_n)$$

are established and hence, a load T can be detected according to these equations.

In this way, to detect the load-applied position and the load by the piezoelectric load sensor, just two voltages $VU_n$ and $VL_n$, which are generated by the upper and lower piezoelectric elements, are the only required physical quantities to be measured. Thus, a complicated signal treating mechanism is not required, and the detection of load-applied position and the like can be rapidly carried out. The piezoelectric load sensor has a simple structure and can be made at a lower cost than the prior art.

It is another object of the present invention to provide a load-applied position detection process of the above-described type, by which the load-applied position can be detected rapidly and with a good accuracy.

To achieve the above object, according to the present invention, there is provided a process for detecting a load-applied position using a piezoelectric load sensor which comprises an upper conductor, a lower conductor, an intermediate conductor located between the upper and lower conductors, a plurality of upper piezoelectric elements interposed between the upper and intermediate conductors and arranged in a row, and a plurality of lower piezoelectric elements interposed between the lower and intermediate conductors and arranged in a row. The piezoelectric constants of the plurality of upper piezoelectric elements are set so that they gradually decrease from the piezoelectric element located at one end in a direction of arrangement toward the piezoelectric element located at the other end in the direction of arrangement. The piezoelectric constants of the plurality of lower piezoelectric elements are set so that they gradually increase from the piezoelectric element located at one end in a direction of arrangement toward the piezoelectric element located at the other end in the direction of arrangement. When a load is applied to one of the upper piezoelectric elements and one of the lower piezoelectric elements which is opposed to the one upper piezoelectric element, a load-applied position is detected based on a ratio of voltages generated by the upper and lower piezoelectric elements.

If such a process is employed, the load-applied position can be rapidly detected with good accuracy based on the above-described theory.

In addition, according to the present invention, there is provided a piezoelectric load sensor comprising a first detector having a piezoelectric constant $d_1$ which is uniform over the entire area of the detector, and a second detector laminated on the first detector and having piezoelectric constants $d_{21}>d_{22}>d_{23}$ which gradually decrease from one end toward the other end in a direction which intersects a direction of lamination thereof. A ratio $Q_2/Q_1$ of output values $Q_1$ and Q2 from the first and second detectors are used for the detection of a load-applied position. The output value $Q_1$ from the first detector is used for the detection of a load.

With this piezoelectric load sensor, the detection of the load-applied position can be carried out in a one-dimensional manner and the detection of the load can be carried out, irrespective of such a load-applied position. In this case, the measured physical quantities required for the two detections are only two output values from the first and second detectors. Thus, a complicated signal treating mechanism is not required, and the detection of the load-applied position and the like can be rapidly carried out. The piezoelectric load sensor is of a simple structure and can be made at a lower cost than the prior art.

According to a further aspect of the present invention, there is provided a piezoelectric load sensor having a structure in which first, second and third detectors are laminated one on another. The first detector has a piezoelectric constant $d_1$ which is uniform over the entire area of the detector. The second detector has piezoelectric constants $d_{21}$, $d_{22}$ and $d_{23}$ which gradually decrease from one end toward the other end in a direction which intersects a direction of lamination thereof (i.e., $d_{31}>d_{32}>d_{33}$). The third detector has piezoelectric constants $d_{21}$, $d_{22}$ and $d_{23}$ which gradually decrease from one end toward the other end in a direction which intersects a direction of lamination thereof (i.e., $d_{31}>d_{32}>d_{33}$). The third detector is disposed so that a direction of gradual decrease of piezoelectric constants thereof intersects a direction of gradual decrease of the piezoelectric constants of the second detector. A ratio $Q_2/Q_1$ of output values $Q_1$ and $Q_2$ from the first and second detectors is used for the detection of a load-applied position in the direction of gradual decrease of the piezoelectric constants of the second detector. A ratio $Q_3/Q_1$ of output values $Q_1$ and $Q_3$ from the first and third detectors is used for the detection of a load-applied position in the direction of gradual decrease of the piezoelectric constants of the third detector. The output value $Q_1$ from the first detector is used for the detection of a load in each of the load-applied positions.

With this piezoelectric load sensor, the detection of the load-applied position is carried out in a two-dimensional manner and the detection of the load is carried out, irrespective of the load-applied position. In this case, the measured physical quantities required for the three detections are only three output values from the first, second and third detectors. Thus, a complicated signal treating mechanism is not required, and the detection of the load-applied position and the like can be rapidly carried out. The piezoelectric load sensor has a simple structure and can be made at a lower cost than the prior art.

The above and other objects, features and advantages of the invention will become apparent from the following description of the preferred embodiments taken in conjunction with the accompanying drawings.

BRIEF DESCRIPTION OF THE DRAWINGS

FIG. 13 is a view for explaining a process for producing the fifth example of the load sensor;

DETAILED DESCRIPTION OF THE PREFERRED EMBODIMENTS (FIRST EMBODIMENT)

Figure 1:
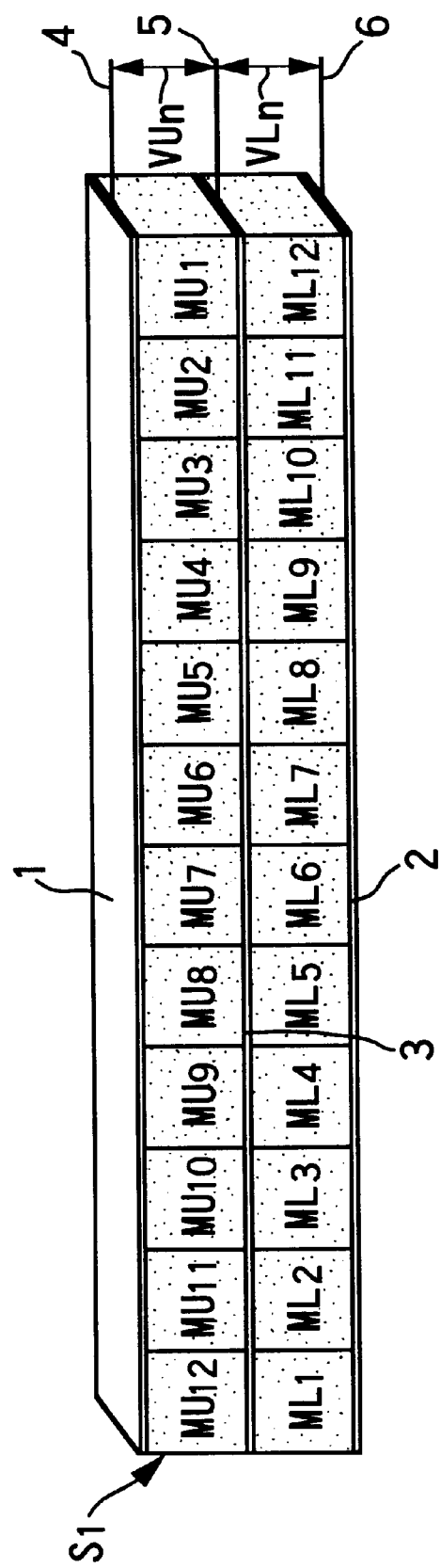
FIG. 1 is a perspective view for explaining the principle of a load sensor.

A piezoelectric load sensor $S_1$ shown in FIG. 1 includes an upper copper foil 1, which assumes a band-like shape, and is an upper conductor. A lower copper foil 2, which assumes a band-like shape, is a lower conductor. An intermediate copper foil 3, which assumes a band-like shape, is an intermediate conductor located between the upper and lower copper foils 1 and 2. A plurality of upper piezoelectric elements, e.g., first to twelfth upper piezoelectric elements $MU_1$ to $MU_{12}$ in FIG. 1, are interposed between the upper and intermediate copper foils 1 and 3 and are arranged rectilinearly in a row. A plurality of power piezoelectric elements, e.g., first to twelfth lower piezoelectric elements $ML_1$ to $ML_{12}$ in FIG. 1, which are interposed between the lower and intermediate copper foils 2 and 3 and are arranged rectilinearly in a row.

The first to twelfth upper piezoelectric elements $MU_1$ to $MU_{12}$ have their piezoelectric constants set, so that they gradually decrease from the twelfth upper piezoelectric element $MU_{12}$ located at one end in a direction of the arrangement of the upper piezoelectric elements, i.e., at a left end in FIG. 1, toward the first upper piezoelectric element $MU_1$ located at the other end, i.e., at a right end in FIG. 1. Thus, if the piezoelectric constants of the first to twelfth upper piezoelectric elements $MU_1$ to $MU_{12}$ are represented by $dU_1$ to $dU_{12}$, respectively, a relation, $dU_{12} > dU_{11} > dU_{10} > \text{---} > dU_3 > dU_2 > dU_1$, is established.

On the other hand, in the first to twelfth lower piezoelectric elements $ML_1$ to $ML_{12}$, here their piezoelectric constants set, so that they gradually increase from the first lower piezoelectric element $ML_1$ located at one end in the direction of the arrangement of the lower piezoelectric elements, i.e., at a left end in FIG. 1 toward the twelfth lower piezoelectric element $ML_{12}$ located at the other end in the direction of arrangement of the lower piezoelectric elements, i.e., at a right end in FIG. 1. Thus, if the piezoelectric constants of the first to twelfth lower piezoelectric elements $ML_1$ to $ML_{12}$ are represented by $dL_1$ to $dL_{12}$, respectively, a relationship, $dL_1 < dL_2 < dL_3 < \text{---} < dL_{10} < dL_{11} < dL_{12}$, is established.

Lead wires 4, 5 and 6 are connected to the upper, intermediate and lower copper foils 1, 3 and 2, respectively.

In the above-described arrangement, if the sum of electrostatic capacities of the first to twelfth upper piezoelectric elements $MU_1$ to $MU_{12}$ is represented by CU, and the sum of electrostatic capacities of the first to twelfth lower piezoelectric elements $ML_1$ to $ML_{12}$ is represented by CL, and if a load T is applied, for example, to the opposed fourth upper piezoelectric element $MU_4$ and the ninth lower piezoelectric element $ML_9$, a voltage VU4 generated by the fourth upper piezoelectric element $MU_4$ and a voltage $VL_9$ generated by the ninth lower piezoelectric element $ML_9$ are represented by the following equations:

$$VU_4 = (dU_4/CU) \cdot T \quad (1)$$

$$VL_9 = (dL_9/CL) \cdot T \quad (2)$$

$$\therefore VU_4 \cdot (CU/dU_4) = VL_9 \cdot (CL/dL_9) \therefore VU_4/VL_9 = (CL/dU_4)/(CU/dL_9) \quad (3)$$

Therefore, if a theoretical piezoelectrical ratio $VU_4/VL_9$ is previously determined from the piezoelectric constants $dU_4$ which are known values as characteristics of the piezoelectric elements and $dL_9$ and the sum CU, CL of the electrostatic capacities, a load applied to the position of the fourth upper piezoelectric element $MU_4$ can be detected by comparing the theoretical piezoelectric ratio $VU_4/VL_9$ with a piezoelectric ratio $VU_4/VL_9$ calculated from both of the measured generated voltages.

From the above equations (1) and (2), the following equations are derived:

$$T = VL_9 \cdot (CL/dL_9) \quad (4)$$

$$T = VU_4 \cdot (CU/dU_4) \quad (5)$$

and hence, a load T can be detected based on the equations (4) and (5). In this case, the unit of the load T is N (Newton) and hence, in converting the unit of the load T into kg, the load T is divided by an acceleration of gravity 9.8 M/s².

In the first embodiment, the arrangement of the first to twelfth lower piezoelectric elements $ML_1$ to $ML_{12}$ in the row is identical to the arrangement provided when the first to twelfth upper piezoelectric elements $MU_1$ to $MU_{12}$ are rotated through 180° in a horizontal plane.

Thus, the first upper piezoelectric element $MU_1$ and the first lower piezoelectric element $ML_1$; the second upper piezoelectric element $MU_2$ and the second lower piezoelectric element $ML_2$; the third upper piezoelectric element $MU_3$ and the third lower piezoelectric element $ML_3$; - - - the tenth upper piezoelectric element $MU_{10}$ and the tenth lower piezoelectric element $ML_{10}$; the eleventh upper piezoelectric element $MU_{11}$ and the eleventh lower piezoelectric element $ML_{11}$; and the twelfth upper piezoelectric element $MU_{12}$ and the twelfth lower piezoelectric element $ML_{12}$, have the same dielectric characteristic, respectively.

If the piezoelectric load sensor $S_1$ is constructed in the above manner, the number of different types of piezoelectric elements can be one half of the number of all the piezoelectric elements used. Thus, it is possible to improve the producibility of the piezoelectric elements to remarkably reduce the cost of production of the load sensor $S_1$.

In a state in which a given load T has been applied to ones of the piezoelectric elements, e.g., the fourth upper piezoelectric element $MU_4$ and the ninth lower piezoelectric element $ML_9$ opposed to the fourth upper piezoelectric element $MU_4$, the sum $VU_4 + VL_9$ of the voltages $VU_4$ and $VL_9$ generated by the upper and lower piezoelectric elements $MU_4$ and $ML_9$ is equal to the sum $VU_8 + VL_5$ of the voltages $VU_8$ and $VL_5$ generated by other ones of the piezoelectric elements, e.g., the eighth upper piezoelectric element $MU_8$ and the fifth lower piezoelectric element $ML_5$ opposed to the eighth upper piezoelectric element $MU_8$ in a state in which the given load T has been applied to the eighth upper piezoelectric element $MU_8$ and the fifth lower piezoelectric element $ML_5$.

In order to ensure that the relation, $VU_4 + VL_9 = VU_8 + VL_5$ is established in the above manner, it is required that an equation, $(dU_4/CU) + (dL_9/CL) = (dU_8/CU) + (dL_5/CL)$ is established in any mutually opposed upper and lower piezoelectric elements and hence, the following equation must be established:

$$(dU_n/CU) + (dL_{13-n}/CL) = A (\text{constant}) (n=1 \text{ to } 12)$$

Here, if the left side of the equation (2) is added to the left side of the equation (1) and the right side of the equation (2) is added to the right side of the equation (1), respectively, the following equation is derived:

$$VU_4 + VL_9 = (dU_4/CU) \cdot T + (dL_9/CL) \cdot T$$

Therefore, $$VU_4 + VL_9 = AT$$

$$\therefore T = (VU_4 + VL_9)/A \quad (6)$$

If the upper and lower piezoelectric elements ($MU_1$ to $MU_{12}$ and $ML_1$ to $ML_{12}$) are constructed so that the equation, $(dU_n/CU) + (dL_{13-n}/CL) = A$ (constant) (n=1 to 12), is established in the above manner, a proportional relationship of a constant ratio is established for any mutually opposed upper and lower piezoelectric elements between the load T and the sum of the voltages (e.g., $VU_4 + VL_9$, or $VU_8 + VL_5$). Hence, the load T can be easily detected. In this case, the unit of the load T is N (Newton) and hence, in converting the unit of the load T into kg, the load T is divided by the acceleration of gravity 9.8 m/s².

The materials for forming the piezoelectric element include perovskite-type ferroelectric materials such as $BaTiO_3$, $Pb(ZrTi)O_3$, $KNbO_3$, $SrTiO_3$, $Pb(MgNb)O_3$ and the like, $LiNbO_3$-type ferroelectric materials such as $LiNbO_3$, $LiTaO_3$ and the like, tungsten bronze-type ferroelectric materials such as $K_3Li_2Nb_5O_{15}$, $Ba_2NaNb_5O_{15}$ and the like, and the materials having a piezoelectric property such as quartz ($\alpha$-$SiO_2$), ZnO, berlinite ($\alpha$-$AlPO_4$), Rochelle salt, PVDF and the like. These materials are usually used alone, but may be used in combination with one another. Any of these materials (including a combination) can be combined with any material having a rubber elasticity or any material having a lower modulus of elasticity such as polymers to produce a soft piezoelectric element.

EXAMPLE I

A. Production of Starting Powder for Piezoelectric Element

1. A first starting powder having a composition of $Pb(Zr_{0.52}Ti_{0.48})O_3$ was produced in a process which will be described below.

(a) A powder of PbO (made by Hayasi Junyaku Industries, Co.) was weighed so that the number of moles of Pb contained in 1/5 mole of the composition was equal to the number of moles of Pb contained in PbO. A powder of $ZrO_2$ (made by Yasuzui Hikotaro Shoten, Co.) and a powder of $TiO_2$ (made by Kisida Kagaku, Co.) were weighed in the same manner. Ethyl alcohol (made by Kanto Kagaku, Co.) was added in an amount of 100 cc to these powders, and they were mixed in a pot made of a resin for 16 hours. Then, the powder mixture was dried.

(b) The powder mixture was subjected to a primary thermal treatment in the atmospheric air at 850° for 6 hours.

(c) Ethyl alcohol (made by Kanto Kagaku, Co.) was added in an amount of 100 cc to the powder mixture resulting from the primary thermal treatment, and the resulting material was pulverized and mixed in a pot made of a resin for 16 hours, and then dried.

(d) The powder material resulting from the drying was subjected to a secondary thermal treatment in the atmospheric air at 950° for 6 hours and then, a step similar to the step (c) was carried out to produce a first starting powder.

2. Steps similar to the steps (a) to (d) were carried out sequentially to produce a second starting powder having a composition of $Pb(Zr_{0.5}Ti_{0.5})O_3$ and a third starting powder having a composition of $Pb(Zr_{0.48}Ti_{0.52})O_3$.

B. Production of Piezoelectric Element (a) The first starting powder was placed into a mold having an inside diameter of 13 mm to form a plurality of disk-shaped preforms at a molding pressure of 500 kgf/cm². Then, each of the preforms was subjected to a CIP treatment at 4,000 kgf/cm² to provide a compact.

(b) Each of the compacts was placed into a crucible of alumina and subjected to a thermal treatment in the atmospheric air at 1,200° for one hour to provide a sintered product.

(c) Each of the sintered products was finished into a thickness of 1.5 mm by a surface grinding treatment.

(d) A gold electrode was deposited on each of the flat surfaces of each sintered product by spattering, and lead wires were connected to all the gold electrodes, respectively.

(e) Each of the sintered products was subjected to a polarizing treatment for applying an electrostatic field of 6 kV/mm at room temperature for 30 minutes, and the lead wires were then removed to provide a plurality of piezoelectric elements.

Figure 2:
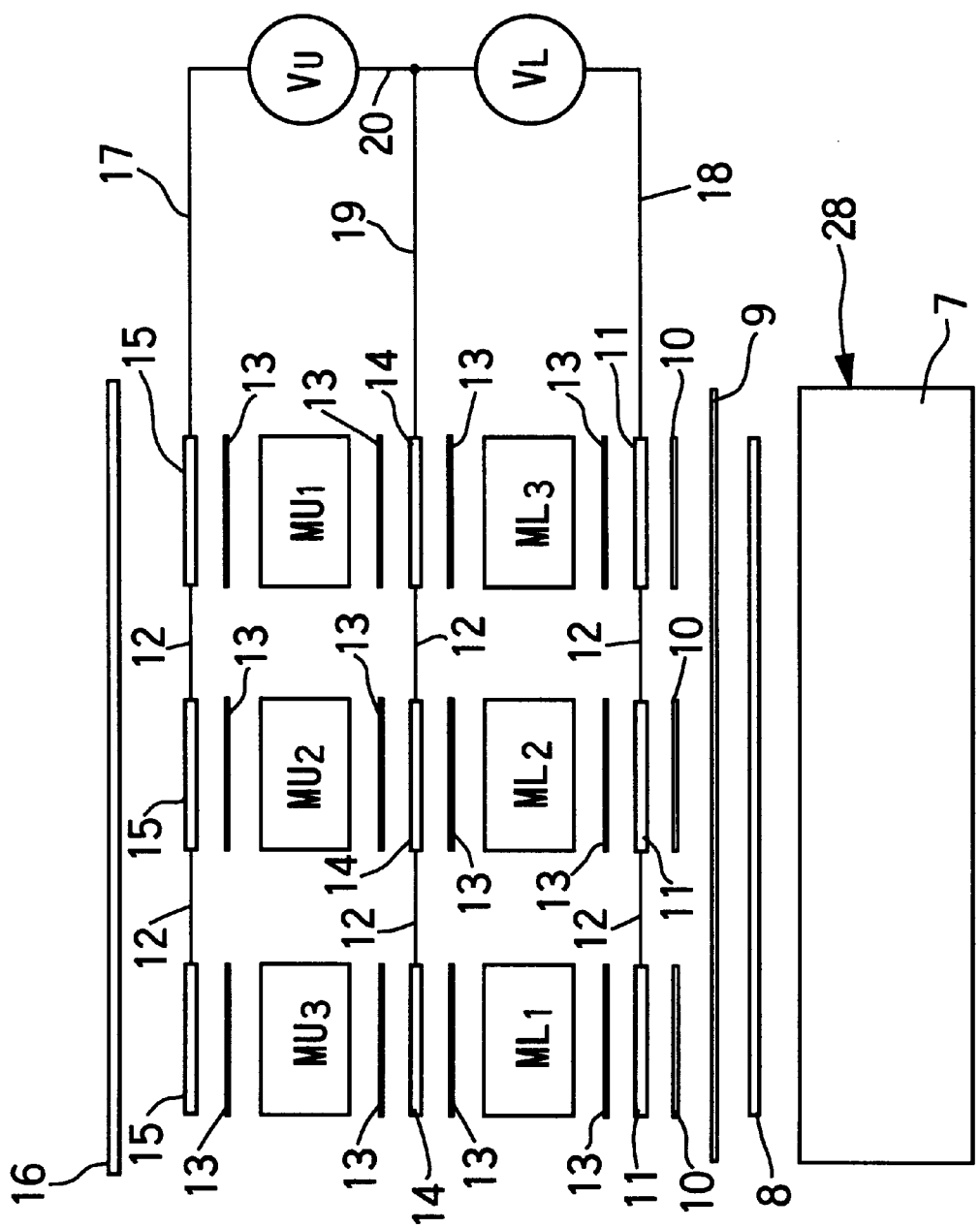
FIG. 2 is an illustration for explaining a process for producing a first example of a load sensor.

A plurality of piezoelectric elements were also produced using the second and third starting powders in the same manner as that described above. C. Production of Piezoelectric Load Sensor (a) As shown in FIG. 2, a sheet 9 of polyvinyl chloride was affixed to an upper surface of an aluminum plate 7 with an adhesive sheet 8 interposed therebetween. This was used as a base 28.

(b) Three lower copper foils 11 having a thickness of 0.1 mm and the same diameter as the piezoelectric element were affixed to the sheet 9 at a predetermined distance with an adhesive sheet 10 interposed therebetween. The adjacent lower copper foils 11 were connected to each other by a conductive wire 12. This was used as a lower conductor.

(c) The first to third lower piezoelectric elements $ML_1$ to $ML_3$ were affixed to the three lower copper foils 11 with a conductive paste interposed therebetween, respectively. In this case, the first to third lower piezoelectric elements $ML_1$ to $ML_3$ were disposed with their polarizing directions uniform, so that the first lower piezoelectric element $ML_1$ was located at a left end in FIG. 2, and the third lower piezoelectric element $ML_3$ was located at a right end in FIG. 2.

(d) Three intermediate copper foils 14 similar to those described above were affixed to the first to third lower piezoelectric elements $ML_1$ to $ML_3$ with a conductive paste 13 interposed therebetween, respectively. The adjacent intermediate copper foils 14 were connected to each other by a conductive wire 12. This was used as an intermediate conductor.

(e) The first to third upper piezoelectric elements $MU_1$ to $MU_3$ were affixed to the three intermediate copper foils 14 with the conductive paste 13 interposed therebetween, respectively. In this case, the first to third upper piezoelectric elements $MU_1$ to $MU_3$ were disposed with their polarizing directions uniform, so that the first upper piezoelectric elements $MU_1$ to $MU_3$ were opposed to the third to first lower piezoelectric elements $ML_3$ to $ML_1$, respectively.

(f) Three upper copper foils 15 similar to those described above were affixed to the first to third upper piezoelectric elements $MU_1$ to $MU_3$ with the conductive paste 13 interposed therebetween, respectively. The adjacent upper copper foils 15 were connected to each other by the conductive wire 12. This was used as an upper conductor.

(g) A sheet 16 of polyvinyl chloride was placed onto the upper copper foils 15 so as to cover the upper copper foils 15.

(h) A lead wire 17 was connected to one of the upper coil foils 15 located at an outermost position, and was connected to a terminal of an upper voltmeter $V_U$. A lead wire 18 was connected to one of the lower copper foils 11 located at an outermost position, and was connected to a terminal of a lower voltmeter $V_L$. Further, a lead wire 19 was connected to one of the intermediate copper foils 14 located at an outermost position, and was connected to a conductive wire 20 between both the terminals of the upper and lower voltmeters $V_U$ and $V_L$.

Figure 3:
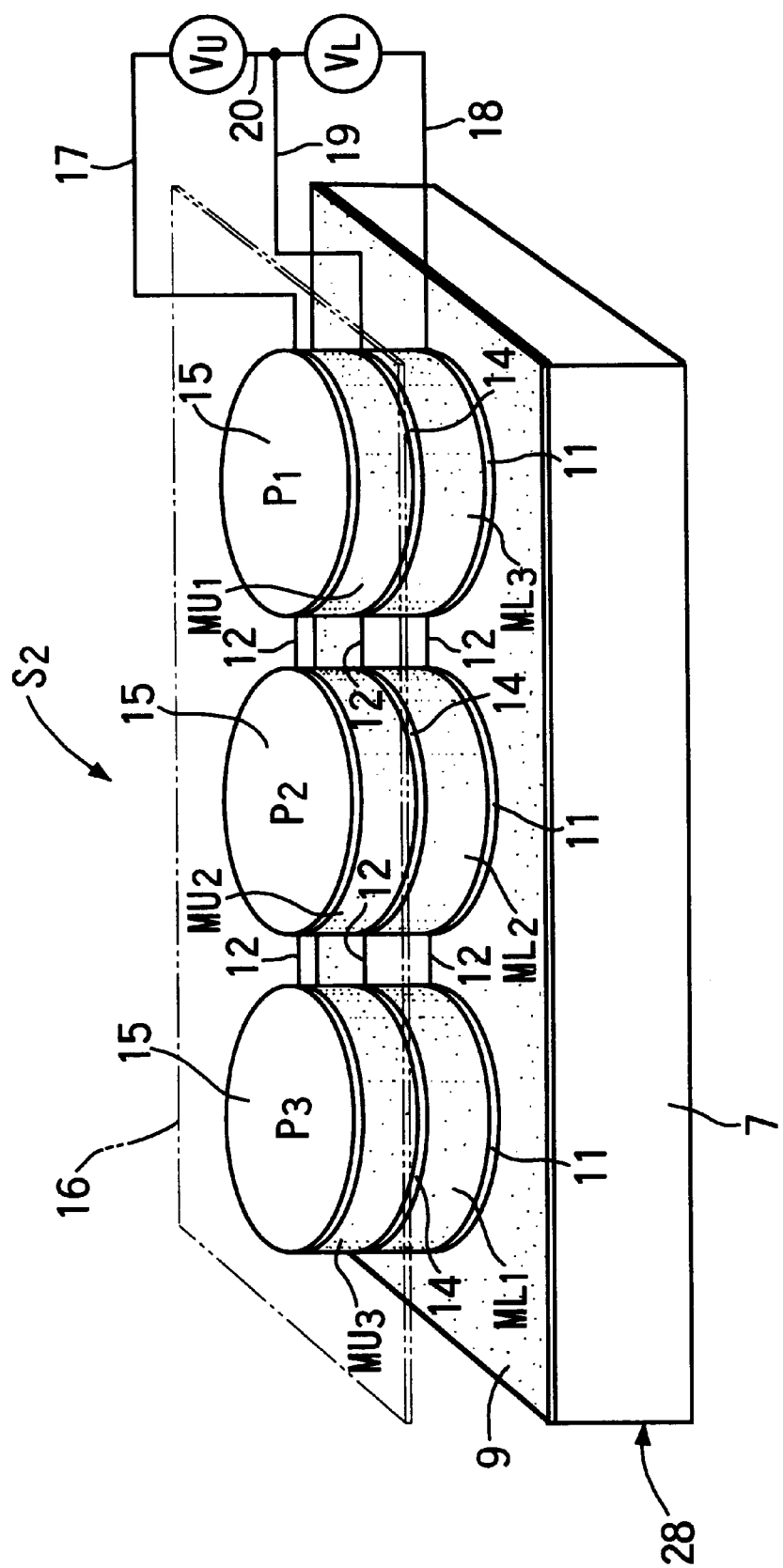
FIG. 3 is a perspective view of the first example of the load sensor.

A piezoelectric load sensor $S_2$ shown in FIG. 3 was produced in the above manner. In this piezoelectric load sensor $S_2$, the first upper and lower piezoelectric elements $MU_1$ and $ML_1$ were formed from the first starting powder; the second upper and lower piezoelectric elements $MU_2$ and $ML_2$ were formed from the second starting powder, and the third upper and lower piezoelectric elements $MU_3$ and $ML_3$ were formed from the third starting powder.

The piezoelectric constants $dU_1$ to $dU_3$ of the first to third upper piezoelectric elements $MU_1$ to $MU_3$ and the piezoelectric constants $dL_1$ to $dL_3$ of the first to third lower piezoelectric elements $ML_1$ to $ML_3$ are as given in Table 1. Here, the term "piezoelectric constant" means a value calculated from a voltage generated in a polarizing direction when a load is applied to the piezoelectric element in the polarizing direction.

TABLE 1

|  | Piezoelectric constant ($\times 10^{-12}$ C/N) | | |
| --- | --- | --- | --- |
| Third to first upper piezoelectric elements $MU_3$ to $MU_1$ | $dU_3$ ($MU_3$) 102 | $dU_2$ ($MU_2$) 61 | $dU_1$ ($MU_1$) 22 |
| First to third lower piezoelectric elements $ML_1$ to $ML_3$ | $dL_1$ ($ML_1$) 22 | $dL_2$ ($ML_2$) 61 | $dL_3$ ($ML_3$) 102 |

The sum CU of the electrostatic capacities of the first to third upper piezoelectric elements $MU_1$ to $MU_3$ and the sum CL of the electrostatic capacities of the first to third lower piezoelectric elements $ML_1$ to $ML_3$ are equal to each other, and CU=CL=1.435 nF.

Therefore, the theoretical voltage ratios $VU_1/VL_3$, $VU_2/VL_2$ and $VU_3/VL_1$ in the load-applied positions of the first upper and third lower piezoelectric elements $MU_1$ and $ML_3$, the second upper and lower piezoelectric elements $MU_2$ and $ML_2$ and the third upper and first lower piezoelectric elements $MU_3$ and $ML_1$ can be calculated according to the following equations, using the equation (3):

$$VU_1/VL_3 = (CL \cdot dU_1)/(CU \cdot dL_3) = 22/102 = 0.22$$

$$VU_2/VL_2 = (CL \cdot dU_2)/(CU \cdot dL_2) = 61/61 = 1.0$$

$$VU_3/VL_1 = (CL \cdot dU_3)/(CU \cdot dL_1) = 102/22 = 4.6$$

Then, loads of 2.00 kg, 3.42 kg, 5.28 kg and 7.28 kg were applied to the load-applied position $P_1$ on the first upper piezoelectric element $MU_1$, and a voltage $VU_1$ generated by the first upper piezoelectric element $MU_1$ and a voltage $VL_3$ generated by the third lower piezoelectric element $ML_3$ were measured for each of the loads. The ratio $VU_1/VL_3$ of both the generated voltages, loads T(4) and T(5) according to the equations (4) and (5), the sum $VU_1+VL_3$ of the generated voltages, and a load T(6) according to the equation (6), were calculated based on these measured values.

The measurement and calculation similar to those just described above were also carried out for the load-applied positions $P_2$ and $P_3$ on the second and third upper piezoelectric elements $MU_2$ and $MU_3$.

Table 2 shows the results of these measurements and calculations. In Table 2, the unit of the generated voltages $VU_1$ and $VL_3$ and the like is volt, and the unit of the loads T(4), T(5) and T(6) is kg.

TABLE 2

|  | Load (kg) | $VU_1$ | $VL_3$ | $VU_1/VL_3$ | T(4) | T(5) | $VU_1 + VL_3$ | T(6) |
|---|---|---|---|---|---|---|---|---|
| Load-applied position $P_1$ | 2.00 | 0.35 | 1.37 | 0.25 | 1.97 | 2.33 | 1.72 | 2.03 |
|  | 3.42 | 0.60 | 2.30 | 0.26 | 3.30 | 3.99 | 2.90 | 3.42 |
|  | 5.28 | 0.86 | 3.68 | 0.23 | 5.28 | 5.72 | 4.54 | 5.36 |
|  | 7.28 | 1.28 | 4.88 | 0.26 | 7.01 | 8.52 | 6.16 | 7.27 |

|  | Load (kg) | $VU_2$ | $VL_2$ | $VU_2/VL_2$ | T(4) | T(5) | $VU_2 + VL_2$ | T(6) |
|---|---|---|---|---|---|---|---|---|
| Load-applied position $P_2$ | 2.00 | 0.82 | 0.77 | 1.07 | 1.84 | 1.97 | 1.59 | 1.91 |
|  | 3.42 | 1.40 | 1.39 | 1.01 | 3.33 | 3.36 | 2.79 | 3.35 |
|  | 5.28 | 2.14 | 2.19 | 0.98 | 5.26 | 5.13 | 4.33 | 5.20 |
|  | 7.28 | 3.04 | 3.03 | 1.00 | 7.27 | 7.30 | 6.07 | 7.29 |

|  | Load (kg) | $VU_3$ | $VL_1$ | $VU_3/VL_1$ | T(4) | T(5) | $VU_3 + VL_1$ | T(6) |
|---|---|---|---|---|---|---|---|---|
| Load-applied position $P_3$ | 2.00 | 1.48 | 0.30 | 4.93 | 2.00 | 2.12 | 1.78 | 2.10 |
|  | 3.42 | 2.44 | 0.54 | 4.54 | 3.59 | 3.50 | 2.98 | 3.52 |
|  | 5.28 | 3.97 | 0.78 | 5.06 | 5.19 | 5.70 | 4.75 | 5.61 |
|  | 7.28 | 5.23 | 1.13 | 4.64 | 7.52 | 7.51 | 6.36 | 7.51 |

Figure 4:
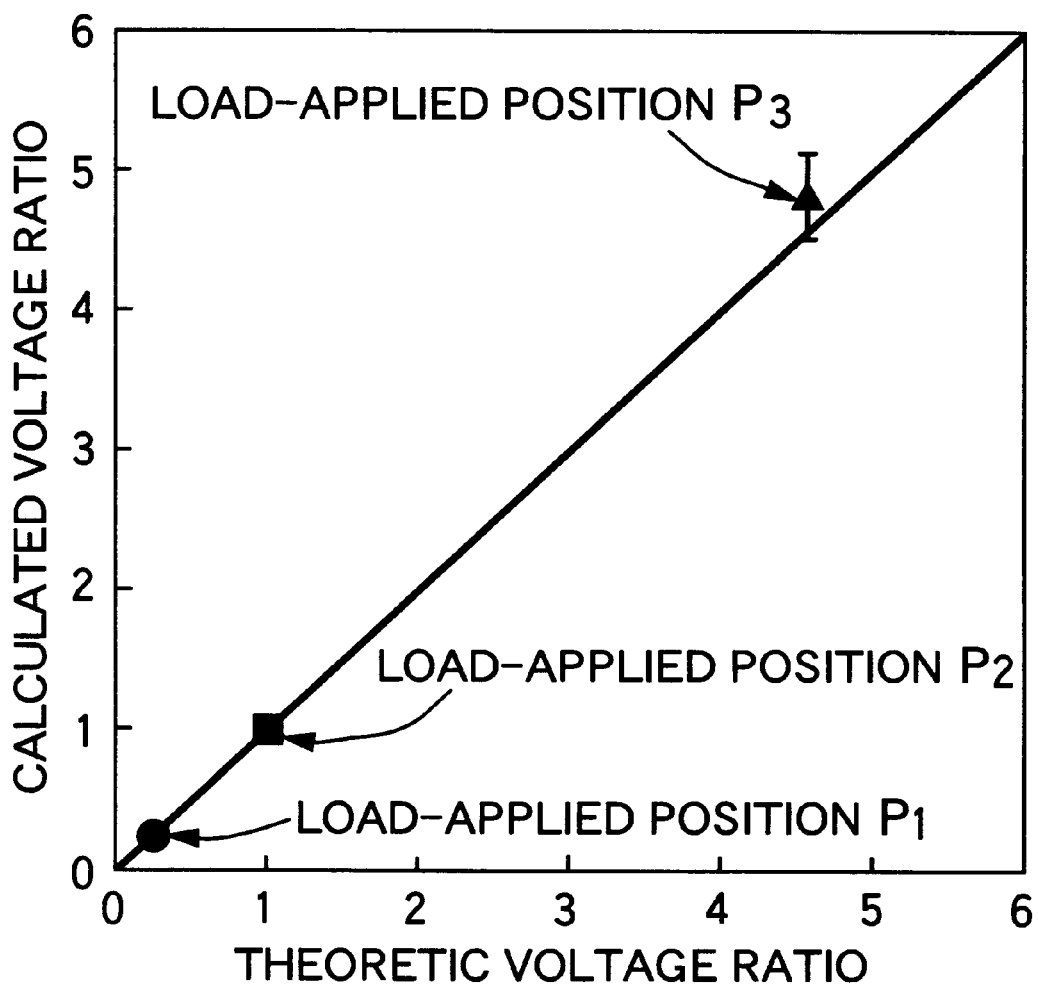
FIG. 4 is a graph showing the relationship between the theoretical voltage ratio and the calculated voltage ratio.

The comparison of the theoretical voltage ratio with the voltage ratio calculated from the measured value in Table 2 is as shown in Table 3. FIG. 4 is a graph taken from Table 3.

TABLE 3

| Load-applied position | Theoretical voltage ratio | Calculated voltage ratio |
|---|---|---|
| $P_1$ | 0.22 | 0.23 to 0.26 |
| $P_2$ | 1.0 | 0.98 to 1.07 |
| $P_3$ | 4.6 | 4.54 to 5.06 |

As apparent from Table 3 and FIG. 4, the theoretical voltage ratio and the calculated voltage ratio are substantially matched with each other in the load-applied positions $P_1$ to $P_3$. Hence, the load-applied position can be rapidly detected in a one-dimensional manner from the calculated voltage ratio based on the theoretical voltage ratio.

Figure 5:
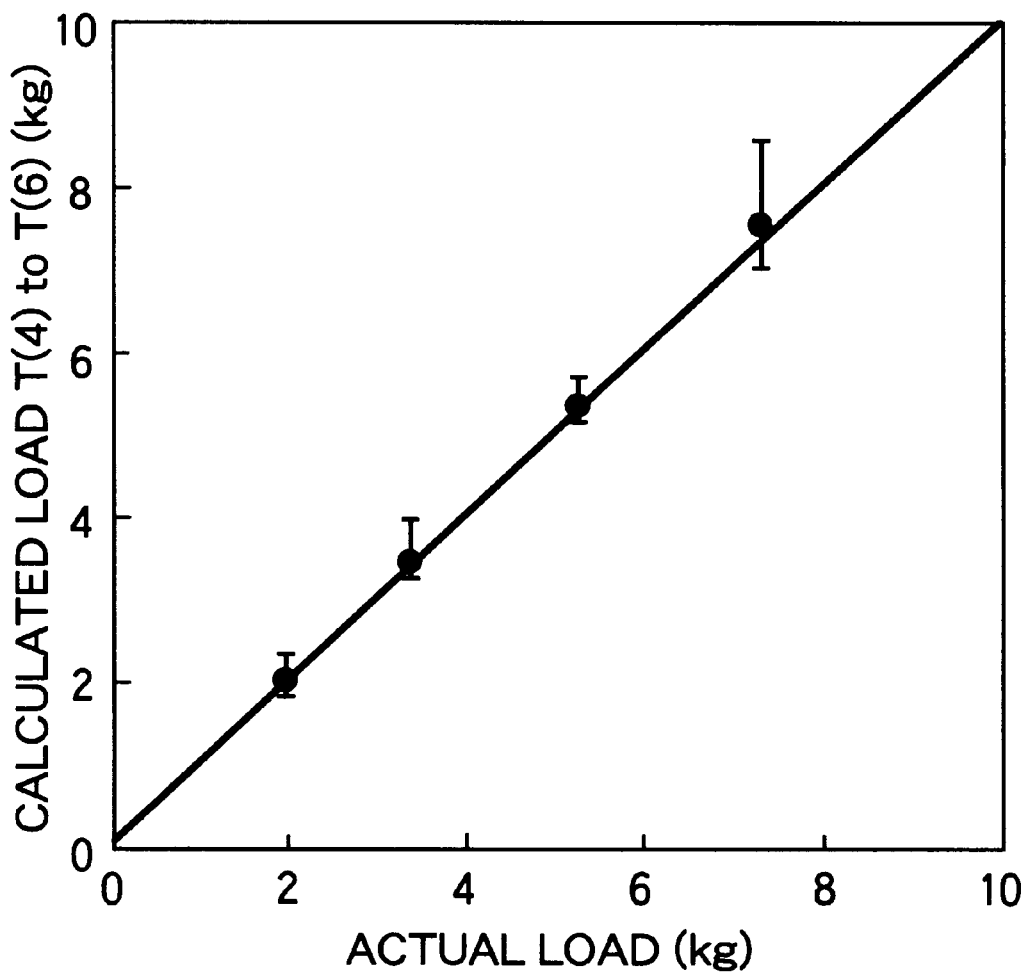
FIG. 5 is a graph showing the relationship between the actual load and the calculated loads T(4) to T(6)

The comparison of the actual load with the calculated load in Table 2 is as shown in Table 4. FIG. 5 is a graph taken from Table 4.

TABLE 4

| Actual load (kg) | Calculated load T(4) to T(6) (kg) |
|---|---|
| 2.00 | 1.84 to 2.33 |
| 3.42 | 3.30 to 3.99 |
| 5.28 | 5.13 to 5.72 |
| 7.28 | 7.01 to 8.52 |

As apparent from Table 4 and FIG. 5, the actual load and the calculated load are substantially matched with each other. Hence, the load can be rapidly determined in a one-dimensional manner from the sum VU+VL of the generated voltages.

EXAMPLE II

Figure 6:
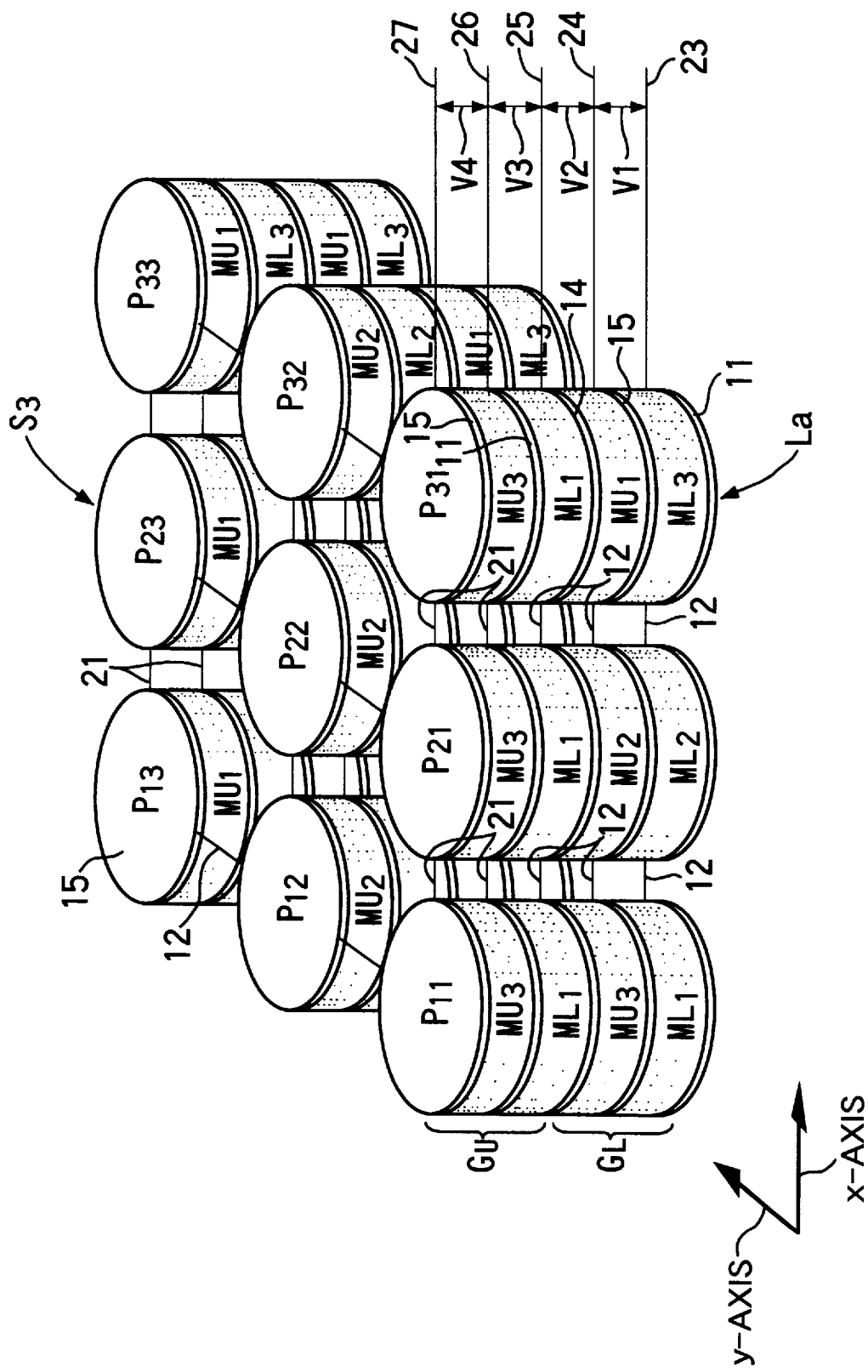
FIG. 6 is a perspective view of a second example of a load sensor.

A piezoelectric load sensor $S_3$ shown in FIG. 6 is comprised of a lower piezoelectric unit group $G_L$ and an upper piezoelectric unit group $G_U$, which are formed from piezoelectric units having substantially the same structure as in the piezoelectric load sensor $S_2$ in EXAMPLE I.

Figure 7:
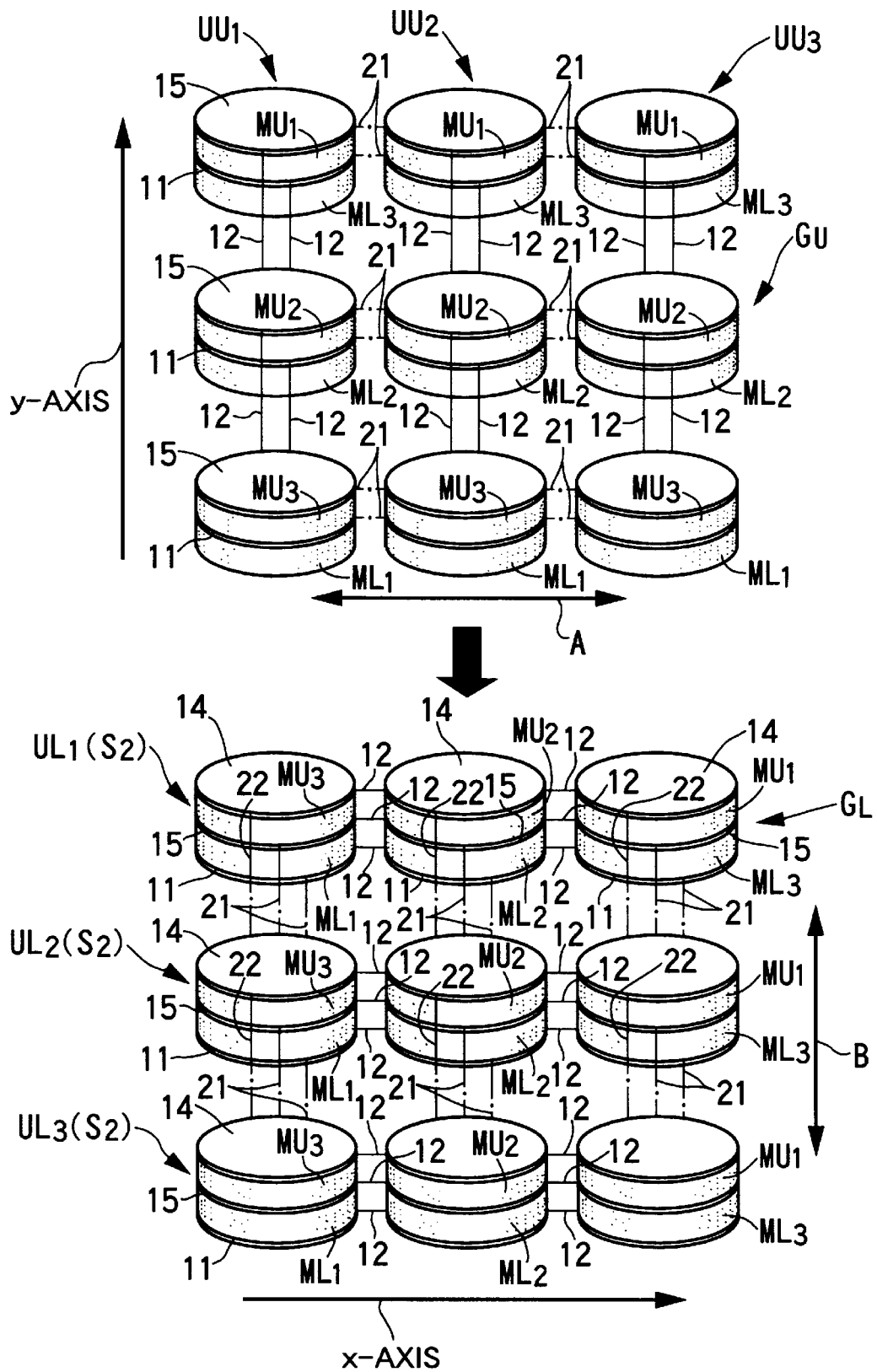
FIG. 7 is a view for explaining a process for producing the second example of the load sensor.

As best shown in FIG. 7, the lower piezoelectric unit group $G_L$ includes a plurality of, e.g., first, second and third (in the illustrated embodiment) lower piezoelectric units $UL_1$, $UL_2$ and $UL_3$. Each of the lower piezoelectric units $UL_1$, $UL_2$ and $UL_3$ includes an upper conductor comprising three upper copper foils 15 and two conductive wires 12 connecting the upper copper foils 15; a lower conductor comprising three lower copper foils 11 and two conductive wires 12 connecting the lower copper foils 11; first, second and third lower piezoelectric elements $ML_1$, $ML_2$ and $ML_3$ interposed between the upper and lower copper foils 15 and 11 and arranged in a row; and first, second and third upper piezoelectric elements $MU_1$, $MU_2$ and $MU_3$ located above the upper copper foils 15 and arranged in a row.

In the first to third upper piezoelectric elements $MU_1$, $MU_2$ and $MU_3$, if their piezoelectric constants are represented by $dU_1$ to $dU_3$, as shown in Table 1, a relationship, $dU_3 > dU_2 > dU_1$ is established.

In addition, if the piezoelectric constants of the first to third lower piezoelectric elements $ML_1$, $ML_2$ and $ML_3$ are represented by $dL_1$ to $dL_3$, a relationship, $dL_1 < dL_2 < dL_3$ is established.

In the lower piezoelectric unit group $G_L$, the first to third lower piezoelectric units $UL_1$ to $UL_3$ are arranged in a row, so that ones of the upper piezoelectric elements $MU_1$ to $MU_3$, which have the maximum piezoelectric constant, namely, the third upper piezoelectric elements $MU_3$, are adjacent each other, and the adjacent conductors are electrically connected to each other. Thus, the upper copper foils as well as the lower copper foils 11 are electrically connected to each other through conductive wires 21.

An intermediate conductor is disposed on each of the lower piezoelectric unit $UL_1$ to $UL_3$ in the lower piezoelectric unit group $G_L$. Each of the intermediate conductors comprises three intermediate copper foils 14 superposed on the first to third upper piezoelectric elements $MU_1$ to $MU_3$, and conductive wires 12 connecting these upper piezoelectric elements $MU_1$ to $MU_3$. The adjacent intermediate conductors and thus, the intermediate copper foils 14, are connected to each other through a conductive wire 22 as an electrically connecting means.

The upper piezoelectric unit group $G_U$ includes a plurality of, e.g., first, second and third (in the illustrated embodiment) upper piezoelectric units $UU_1$, $UU_2$ and $UU_3$. Each of the upper piezoelectric units $UU_1$, $UU_2$ and $UU_3$ includes an upper conductor comprising three upper copper foils 15 and two conductive wires 12 connecting the upper copper foils 15; a lower conductor comprising three lower copper foils 11 and two conductive wires 12 connecting the lower copper foils 11; first, second and third upper piezoelectric elements $MU_1$, $MU_2$ and $MU_3$ interposed between the upper and lower copper foils 15 and 11 and arranged in a row; and first, second and third lower piezoelectric elements $ML_1$, $ML_2$ and $ML_3$ located below the lower copper foils 11 and arranged in a row.

In the first to third upper piezoelectric elements $MU_1$, $MU_2$ and $MU_3$, if their piezoelectric constants are represented by $dU_1$, $dU_2$ and $dU_3$, as shown in Table 1, a relationship, $dU_3 > dU_2 > dU_1$ is established.

In addition, if the piezoelectric constants of the first to third lower piezoelectric elements $ML_1$, $ML_2$ and $ML_3$ are represented by $dL_1$ to $dL_3$, a relationship, $dL_1 < dL_2 < dL_3$ is established.

Further, in the upper piezoelectric unit group $G_U$, the first to third upper piezoelectric units $UU_1$ to $UU_3$ are arranged in a row, so that ones of the upper piezoelectric elements $MU_1$ to $MU_3$, which have the maximum piezoelectric constant, namely, the third upper piezoelectric elements $MU_3$, are adjacent each other; and the adjacent conductors are electrically connected to each other. Thus, the upper copper foils 15 as well as the lower copper foils 11 are electrically connected to each other through conductive wires 21.

The upper piezoelectric unit group $G_U$ is superposed on the lower piezoelectric unit group $G_L$ through the intermediate conductors and thus, through the intermediate copper foils 14. In this case, the direction A of arrangement of the first to third upper piezoelectric units $UU_1$ to $UU_3$ and the direction B of arrangement of the first to third lower piezoelectric units $UL_1$ to $UL_3$ are in an intersecting relationship to each other.

The order of arrangement of the upper and lower piezoelectric elements $MU_1$ to $MU_3$ and $ML_1$ to $ML_3$ in the first to third upper piezoelectric units $UU_1$ to $UU_3$ of the upper piezoelectric unit group $G_U$ is the same as the order of arrangement of the upper and lower piezoelectric elements $MU_1$ to $MU_3$ and $ML_1$ to $ML_3$ in the first to third lower piezoelectric units $UL_1$ to $UL_3$ when the lower piezoelectric unit group $G_L$ has been rotated through 90° in a counter-clockwise direction within a horizontal plane.

The upper and lower piezoelectric elements $MU_1$ to $MU_3$ and $ML_1$ to $ML_3$ and the copper foils 11, 14 and 15 opposed to the upper and lower piezoelectric elements $MU_1$ to $MU_3$ and $ML_1$ to $ML_3$ are affixed to each other through the conductive paste 13 in the same manner as described above.

As shown in FIG. 6, in a piezoelectric element laminate La located at one corner, lead wires 23, 24, 25, 26 and 27 are connected to the five copper foils 11, 15, 14, 11 and 15, respectively, and voltages V1 to V4 generated between the adjacent lead wires 23 and 24; 24 and 25; 25 and 26; and 26 and 27 can be measured by a means similar to that described above.

In this case, the sum $C_4$ of the electrostatic capacities of the upper piezoelectric elements $MU_1$ to $MU_3$ and the sum $C_3$ of the electrostatic capacities of the lower piezoelectric elements $ML_1$ to $ML_3$ in the upper piezoelectric unit group $G_U$ as well as the sum $C_2$ of the electrostatic capacities of the upper piezoelectric elements $MU_1$ to $MU_3$ and the sum $C_1$ of the electrostatic capacities of the lower piezoelectric elements $ML_1$ to $ML_3$ in the lower piezoelectric unit group $G_L$ are equal to each other. Hence, $C_1=C_2=C_3=C_4=4.3$ nF.

When the load-applied position P of each of the piezoelectric element laminates La is represented in x-y coordinates by taking an x-axis for the direction A of arrangement of the first to third upper piezoelectric units $UU_1$ to $UU_3$ in the upper piezoelectric unit group $G_U$ and a y-axis for the direction B of arrangement of the first to third lower piezoelectric units $UL_1$ to $UL_3$ in the lower piezoelectric unit group $G_L$, the theoretical voltage ratios in the load-applied positions Pxy were calculated using the equation (3) to provide results shown in Table 5.

TABLE 5

| Load-applied position Pxy | Theoretical voltage ratio | |
|---|---|---|
| | V2/V1 | V4/V3 |
| $P_{11}$ | 4.6 | 4.6 |
| $P_{21}$ | 1.0 | 4.6 |
| $P_{31}$ | 0.22 | 4.6 |
| $P_{12}$ | 4.6 | 1.0 |
| $P_{22}$ | 1.0 | 1.0 |
| $P_{32}$ | 0.22 | 1.0 |
| $P_{13}$ | 4.6 | 0.22 |
| $P_{23}$ | 1.0 | 0.22 |
| $P_{33}$ | 0.22 | 0.22 |

Then, loads of 10 kg, 15 kg and 20 kg were applied to the load-applied position $P_{11}$, and voltages V1 to V4 generated were measured for every load. Ratios V2/V1 and V4/V3 of the generated voltages and the load T(6) according to the equation (6) were calculated based on the measured values of the generated voltages. Similar measurement and calculation were also carried out for the four load-applied positions $P_{21}$, $P_{31}$, $P_{32}$ and $P_{33}$. The results are shown in Table 6. In Table 6, the unit of the generated voltages V1 to V4 is volt, and the unit of the load T(6) is kg.

TABLE 6

| | Load (kg) | V2 | V1 | V2/V1 | V4 | V3 | V4/V3 | T(6) |
|---|---|---|---|---|---|---|---|---|
| Load-applied position $P_{11}$ | 10 | 2.22 | 0.52 | 4.27 | 2.28 | 0.41 | 5.56 | 9.70 |
| | 15 | 3.35 | 0.72 | 4.65 | 3.50 | 0.78 | 4.49 | 14.6 |
| | 20 | 4.63 | 1.21 | 3.83 | 4.72 | 1.10 | 4.29 | 21.0 |
| Load-applied position $P_{21}$ | 10 | 1.33 | 1.51 | 0.88 | 2.37 | 0.52 | 4.56 | 10.0 |
| | 15 | 2.13 | 2.25 | 0.95 | 3.42 | 0.73 | 4.68 | 15.8 |
| | 20 | 2.71 | 2.91 | 0.93 | 4.72 | 0.98 | 4.82 | 20.2 |
| Load- | 10 | 0.47 | 2.28 | 0.21 | 2.34 | 0.54 | 4.33 | 9.73 |

TABLE 6-continued

| | Load (kg) | V2 | V1 | V2/V1 | V4 | V3 | V4/V3 | T(6) |
|---|---|---|---|---|---|---|---|---|
| applied position $P_{31}$ | 15 | 0.83 | 3.34 | 0.25 | 3.46 | 0.78 | 4.44 | 14.8 |
| | 20 | 1.12 | 4.63 | 0.24 | 4.53 | 1.02 | 4.44 | 20.3 |
| Load-applied position $P_{32}$ | 10 | 0.47 | 2.28 | 0.21 | 1.52 | 1.47 | 1.03 | 9.73 |
| | 15 | 0.87 | 3.51 | 0.25 | 2.09 | 2.13 | 0.98 | 15.5 |
| | 20 | 1.20 | 4.62 | 0.26 | 2.76 | 2.84 | 0.97 | 20.6 |
| Load-applied position $P_{33}$ | 10 | 0.47 | 2.26 | 0.21 | 0.54 | 2.31 | 0.23 | 9.66 |
| | 15 | 0.72 | 3.41 | 0.21 | 0.73 | 3.41 | 0.21 | 14.6 |
| | 20 | 1.30 | 4.67 | 0.28 | 0.97 | 4.58 | 0.21 | 21.1 |

If the voltage ratios V2/V1 calculated from the measured values in Table 6 are compared with the theoretical voltage ratio V2/V1 for the load-applied positions $P_{11}$, $P_{21}$, and $P_{31}$ to $P_{33}$ and thus for x=1, x=2 and x=3 and the voltage ratios V4/V3 calculated from the measured values in Table 6 are compared with the theoretical voltage ratio V4/V3 for the load-applied positions $P_{11}$, $P_{21}$, $P_{31}$, $P_{32}$ and $P_{33}$ and thus for y=1, y=2 and y=3, the results are as shown in Table 7.

TABLE 7

| Load-applied position | Theoretical voltage ratio | Calculated voltage ratio |
|---|---|---|
| | V2/V1 | |
| x = 1 ($P_{11}$) | 4.6 | 3.83 to 4.65 |
| x = 2 ($P_{21}$) | 1.0 | 0.88 to 0.95 |
| x = 3 ($P_{31}$, $P_{32}$, $P_{33}$) | 0.22 | 0.21 to 0.28 |
| | V2/V1 | |
| y = 1 ($P_{11}$, $P_{21}$, $P_{31}$) | 4.6 | 4.29 to 5.56 |
| y = 2 ($P_{32}$) | 1.0 | 0.97 to 1.03 |
| y = 3 ($P_{33}$) | 0.22 | 0.21 to 0.23 |

As apparent from Table 7, the load-applied position in the direction of the x-axis can be detected by the calculated voltage ratio V2/V1, and the load-applied position in the direction of the y-axis can be detected by the calculated voltage ratio V4/V3. Namely, the load-applied position can be rapidly detected in a two-dimensional manner by the load sensor $S_3$.

Figure 8:
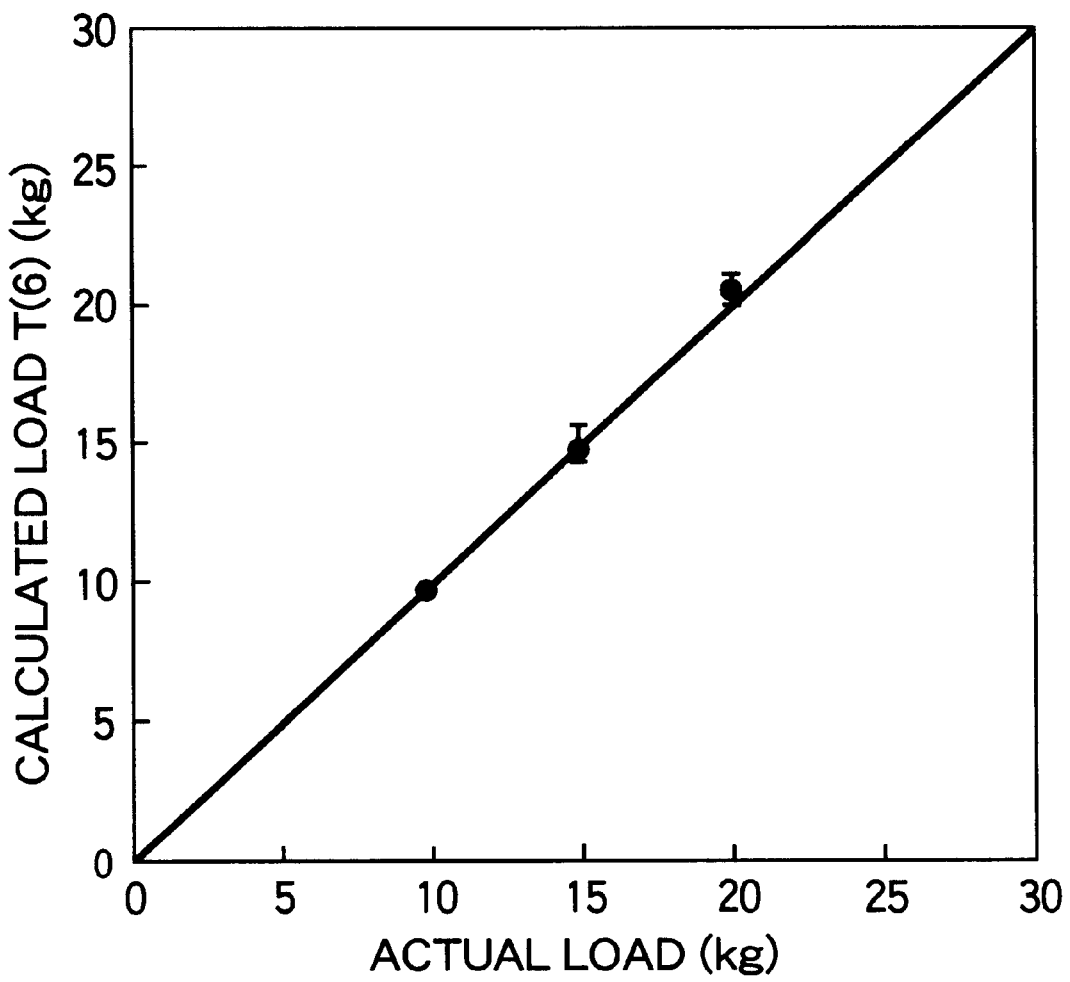
FIG. 8 is a graph showing the relationship between the actual load and the calculated load T(6)

The comparison of the calculated load T(6) with the actual load is as shown in Table 8. FIG. 8 is a graph taken from Table 8.

TABLE 8

| Actual load (kg) | Calculated load T(6) (kg) |
|---|---|
| 10 | 9.66 to 10.0 |
| 15 | 14.6 to 15.8 |
| 20 | 20.2 to 21.1 |

As apparent from Table 8 and FIG. 8, the actual load and the calculated load are substantially matched with each other. Thus, the detection of the load can be satisfactorily carried out.

The upper and lower piezoelectric elements $MU_1$ to $MU_3$ and $ML_1$ to $ML_3$ in the upper piezoelectric unit group $G_U$ and the upper and lower piezoelectric elements $MU_1$ to $MU_3$ and $ML_1$ to $ML_3$ in the lower piezoelectric unit group $G_L$ may be different in piezoelectric characteristic from each other.

EXAMPLE III

Piezoelectric load sensors having various structures will be described in this embodiment.

Figure 9:
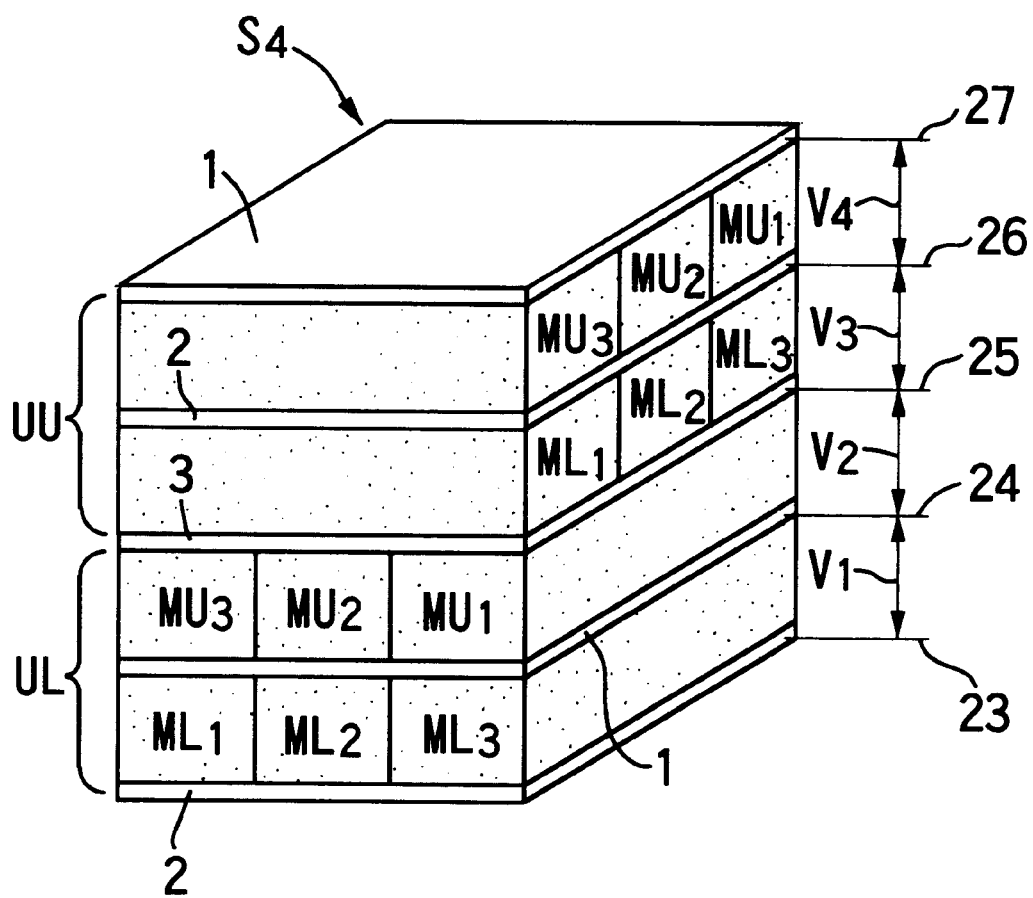
FIG. 9 is a perspective view of a third example of a load sensor.
Figure 10:
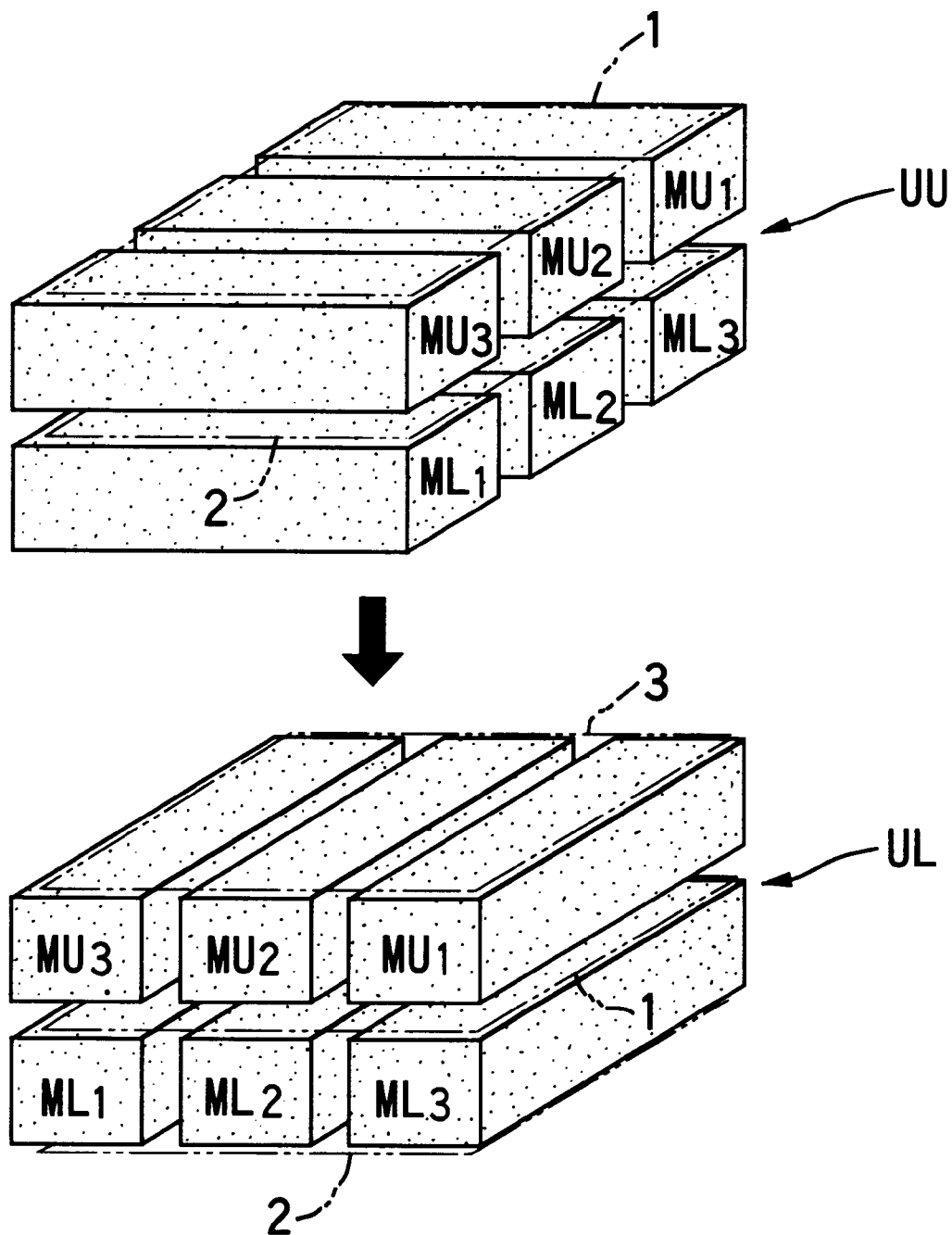
FIG. 10 is a view for explaining a process for producing the third example of the load sensor.

A piezoelectric load sensor $S_4$ shown in FIGS. 9 and 10 is comprised of a lower piezoelectric unit UL and an upper piezoelectric unit UU.

The lower piezoelectric unit UL is comprised of a square upper copper foil 1 as an upper conductor, a square lower copper foil 2 as a lower conductor, a plurality of, e.g., first, second and third (in the illustrated embodiment) rectangular parallelepiped-shaped lower piezoelectric elements $ML_1$, $ML_2$ and $ML_3$ interposed between the upper and lower copper foils 1 and 2 and arranged in a row, and a plurality of, e.g., first, second and third (in the illustrated embodiment) rectangular parallelepiped-shaped upper piezoelectric elements $MU_1$, $MU_2$ and $MU_3$ located above the upper copper foil 1 and arranged in a row in the same direction as is the lower piezoelectric elements $ML_1$, $ML_2$ and $ML_3$. The first, second and third rectangular parallelepiped-shaped upper piezoelectric elements $MU_1$, $MU_2$ and $MU_3$ have their piezoelectric constants set so that they gradually decrease from the third rectangular parallelepiped-shaped upper piezoelectric element $MU_3$ located at one end in a direction of arrangement of the upper piezoelectric elements $MU_1$, $MU_2$ and $MU_3$ toward the first rectangular parallelepiped-shaped upper piezoelectric elements $MU_1$ located at the other end in the direction of arrangement. The first, second and third rectangular parallelepiped-shaped lower piezoelectric elements $ML_1$, $ML_2$ and $ML_3$ have their piezoelectric constants set so that they gradually increase from the first rectangular parallelepiped-shaped lower piezoelectric element $ML_1$ located at one end in the direction of arrangement toward the third rectangular parallelepiped-shaped lower piezoelectric elements $ML_3$ located at the other end in the direction of arrangement. A square intermediate copper foil 3 as an intermediate conductor is disposed on the lower piezoelectric unit UL.

The upper piezoelectric unit UU includes a square upper copper foil 1 as an upper conductor, a square lower copper foil 2 as a lower conductor, a plurality of, e.g., first, second and third (in the illustrated embodiment) rectangular parallelepiped-shaped upper piezoelectric elements $MU_1$, $MU_2$ and $MU_3$ interposed between the upper and lower copper foils 1 and 2 and arranged in a row, and a plurality of, e.g., first, second and third (in the illustrated embodiment) rectangular parallelepiped-shaped lower piezoelectric elements $ML_1$, $ML_2$ and $ML_3$ located below the lower copper foil 2 and arranged in a row in the same direction as is the upper piezoelectric elements $MU_1$, $MU_2$ and $MU_3$. The first, second and third rectangular parallelepiped-shaped upper piezoelectric elements $MU_1$, $MU_2$ and $MU_3$ have their piezoelectric constants set so that they gradually decrease from the third rectangular parallelepiped-shaped upper piezoelectric element $MU_3$ located at one end in a direction of arrangement of the upper piezoelectric elements $MU_1$ $MU_2$ and $MU_3$ toward the first rectangular parallelepiped-shaped upper piezoelectric elements $MU_1$ located at the other end in the direction of arrangement. The first, second and third rectangular parallelepiped-shaped lower piezoelectric elements $ML_1$, $ML_2$ and $ML_3$ have their piezoelectric constants set so that they gradually increase from the first rectangular parallelepiped-shaped lower piezoelectric element $ML_1$ located at one end in the direction of arrangement toward the third rectangular parallelepiped-shaped lower piezoelectric elements $ML_3$ located at the other end in the direction of arrangement.

The upper piezoelectric unit UU is superposed on the lower piezoelectric unit UL with the intermediate copper foil 3. In this case, the direction of arrangement of the upper and lower piezoelectric elements $MU_1$ to $MU_3$ and the $ML_1$ to $ML_3$ in the upper piezoelectric unit UU and the direction of arrangement of the upper and lower piezoelectric elements $MU_1$ to $MU_3$ and the $ML_1$ to $ML_3$ in the lower piezoelectric unit UL are in an intersecting relationship to each other (i.e. perpendicular).

The order of arrangement of the upper and lower piezoelectric elements $MU_1$ to $MU_3$ and $ML_1$ to $ML_3$ in the upper piezoelectric unit UU is the same as the order of arrangement of the upper and lower piezoelectric elements $MU_1$ to $MU_3$ and $ML_1$ to $ML_3$ in the lower piezoelectric unit UL when the lower piezoelectric unit UL has been rotated through 90° in a counterclockwise direction within a horizontal plane.

The upper and lower piezoelectric elements $MU_1$ to $MU_3$ and $ML_1$ to $ML_3$ and the copper foils 1 to 3 opposed to the piezoelectric elements $MU_1$ to $MU_3$ and $ML_1$ to $ML_3$ are affixed to each other through a conductive paste 13 in the same manner as that described above.

Lead wires 23, 24, 25, 26 and 27 are connected to the five copper foils 2, 1, 3, 2 and 1, respectively, so that voltages V1, V2, V3 and V4 generated respectively between the adjacent lead wires 23 and 24; 24 and 25; 25 and 26; and 26 and 27 can be measured by a means similar to that described above.

The piezoelectric load sensor $S_4$ has a structure in which the three same piezoelectric elements located in the same plane in the piezoelectric load sensor $S_3$ shown in FIGS. 6 and 7 is replaced by the single rectangular parallelepiped-shaped piezoelectric element. For example, the three third upper piezoelectric elements $MU_3$ in the lower piezoelectric unit group $G_L$ shown in FIG. 7 correspond to the third rectangular parallelepiped-shaped upper piezoelectric element $MU_3$ in the lower piezoelectric unit UL shown in FIG. 10.

Figure 11:
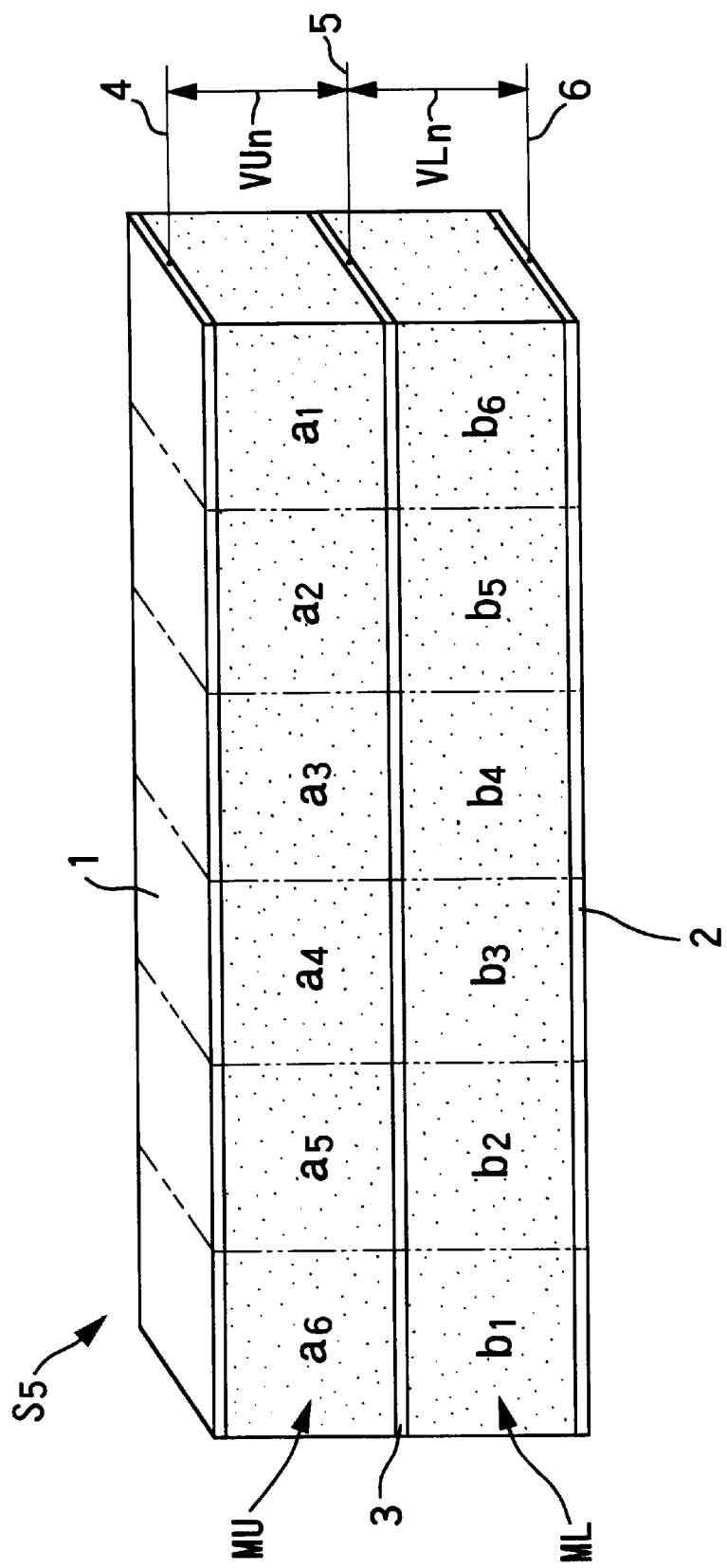
FIG. 11 is a perspective view of a fourth example of a load sensor.

A piezoelectric load sensor $S_5$ shown in FIG. 11 includes a band-shaped upper copper foil 1 as an upper conductor, a band-shaped lower copper foil 2 as a lower conductor, a band-shaped intermediate copper foil 3 as an intermediate conductor located between the upper and lower copper foils 1 and 2, a single rectangular parallelepiped-shaped upper piezoelectric element MU interposed between the upper and intermediate copper foils 1 and 3, and a single rectangular parallelepiped-shaped lower piezoelectric element ML interposed between the lower and intermediate copper foils 3 and 2. The upper piezoelectric element MU is constructed so that its piezoelectric constant gradually decreases from one end thereof toward the other end thereof, and the lower piezoelectric element ML is constructed so that its piezoelectric constant gradually increases from the above-described one end toward the other end.

The upper and lower piezoelectric elements MU and ML and the copper foils 1 to 3 opposed to these piezoelectric elements MU and ML are affixed to each other through a conductive paste 13.

Lead wires 4, 5 and 6 are connected to the upper, intermediate and lower copper foils 1, 3 and 2, respectively, so that voltages $VU_n$ and $VL_n$ generated respectively between the adjacent lead wires 4 and 5; and 5 and 6 can be measured by a means similar to that described above.

The upper and lower piezoelectric elements MU and ML are formed from an elastomer and a piezoelectric powder dispersed in the elastomer, and the polarized density or volume fraction Vf of the piezoelectric powder in regions $a_1$ to $a_6$ and $b_1$ to $b_6$ is increased in the order of the first regions $a_1$ and $b_1$, the second regions $a_2$ and $b_2$, - - - the fifth regions $a_5$ and $b_5$ and the sixth regions $a_6$ and $b_6$.

Figure 12:
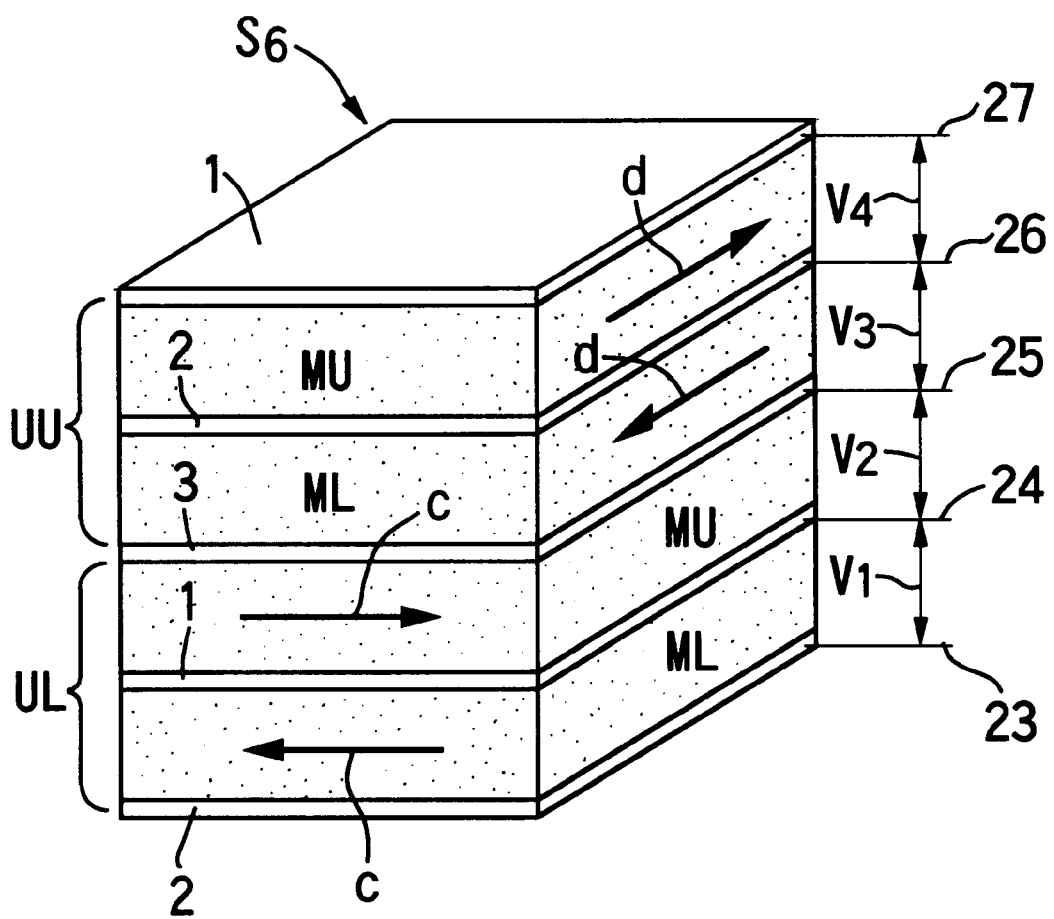
FIG. 12 is a perspective view of a fifth example of a load sensor.

A piezoelectric load sensor $S_6$ shown in FIGS. 12 and 13 is comprised of a lower piezoelectric unit UL and an upper piezoelectric unit UU.

The lower piezoelectric unit UL includes a square upper copper foil 1 as an upper conductor, a square lower copper foil 2 as a lower conductor, a single flat plate-shaped lower piezoelectric element ML interposed between the upper and lower copper foils 1 and 2, and a single flat plate-shaped upper piezoelectric element MU located above the upper copper foil 1. The upper piezoelectric element MU is constructed so that its piezoelectric constant gradually decreases from one end edge thereof toward the other end edge thereof, as shown by an arrow c. The lower piezoelectric element ML is constructed so that its piezoelectric constant gradually increases from an edge at one end thereof corresponding to the one end edge of the upper piezoelectric element MU toward the other end edge corresponding to the other end edge of the upper piezoelectric element MU. In this example 3, the lower piezoelectric element ML is the same as the upper piezoelectric element MU rotated through 180° in a horizontal plane as shown by the arrow c.

A square intermediate copper foil 3 as an intermediate conductor is disposed on the lower piezoelectric unit UL.

The upper piezoelectric unit UU includes a square upper copper foil 1 as an upper conductor, a square lower copper foil 2 as a lower conductor, a single flat plate-shaped upper piezoelectric element MU interposed between the upper and lower conductor copper foils 1 and 2, and a single flat plate-shaped lower piezoelectric element ML located below the lower copper foil 2. The upper piezoelectric element MU is constructed so that its piezoelectric constant gradually decreases from one end edge thereof toward the other end edge thereof, as shown by an arrow d. The lower piezoelectric element ML is constructed so that its piezoelectric constant gradually increases from one end edge corresponding to the one end edge of the upper piezoelectric element MU toward the other end edge corresponding to the other end edge of the upper piezoelectric element MU. In this example 3, the lower piezoelectric element ML is the same as the upper piezoelectric element MU rotated through 180° in a horizontal plane as shown by the arrow d.

The upper piezoelectric unit UU is superposed on the lower piezoelectric unit UL with the intermediate copper foil 3 interposed therebetween.

The directions of gradual decrease and increase of the piezoelectric constant in the upper piezoelectric unit UU are in an intersecting relationship to the directions of gradual decrease and increase of the piezoelectric constant in the lower piezoelectric unit UL.

The upper and lower piezoelectric elements MU and ML and the copper foils 1 to 3 opposed to them are affixed to each other through the conductive paste 13 in the same manner as that described above.

In the illustrated embodiment, the upper and lower piezoelectric elements MU and ML in the upper piezoelectric unit UU are the same as those arranged by rotating the lower piezoelectric unit UL through 90° in a horizontal plane.

As shown in FIG. 12, lead wires 23, 24, 25, 26 and 27 are connected to the five copper foils 2, 1, 3, 2 and 1, respectively, so that voltages V1, V2, V3 and V4 generated between the adjacent lead wires 23 and 24; 24 and 25; 25 and 26; and 26 and 27 can be measured by a means similar to that described above.

The upper and lower piezoelectric elements MU and ML are formed from an elastomer and a piezoelectric powder dispersed in the elastomer in the same manner as that described above, and a variation in piezoelectric constant is provided in the same manner.

(SECOND EMBODIMENT)

Figure 14:
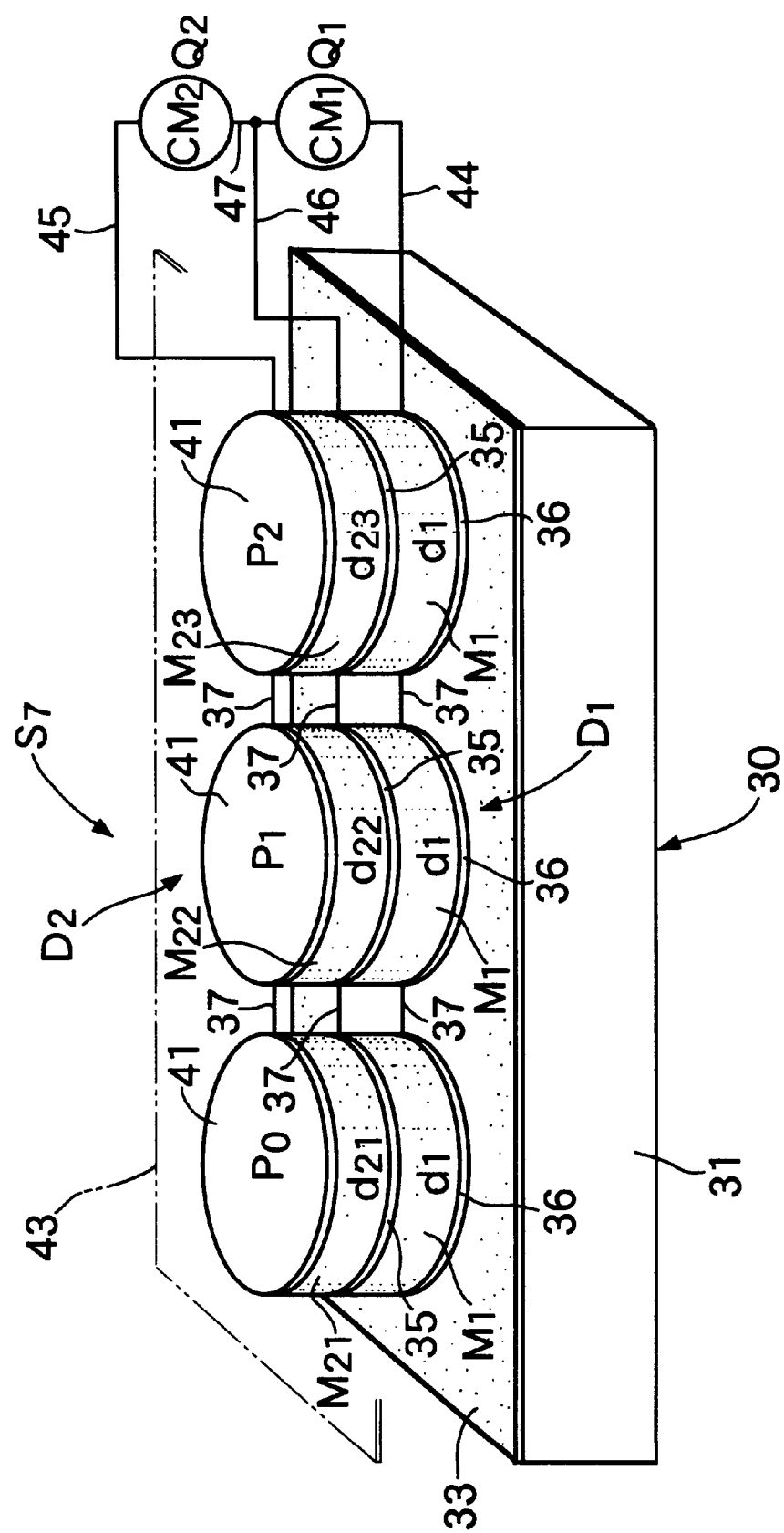
FIG. 14 is a perspective view of a sixth example of a piezoelectric load sensor.
Figure 15:
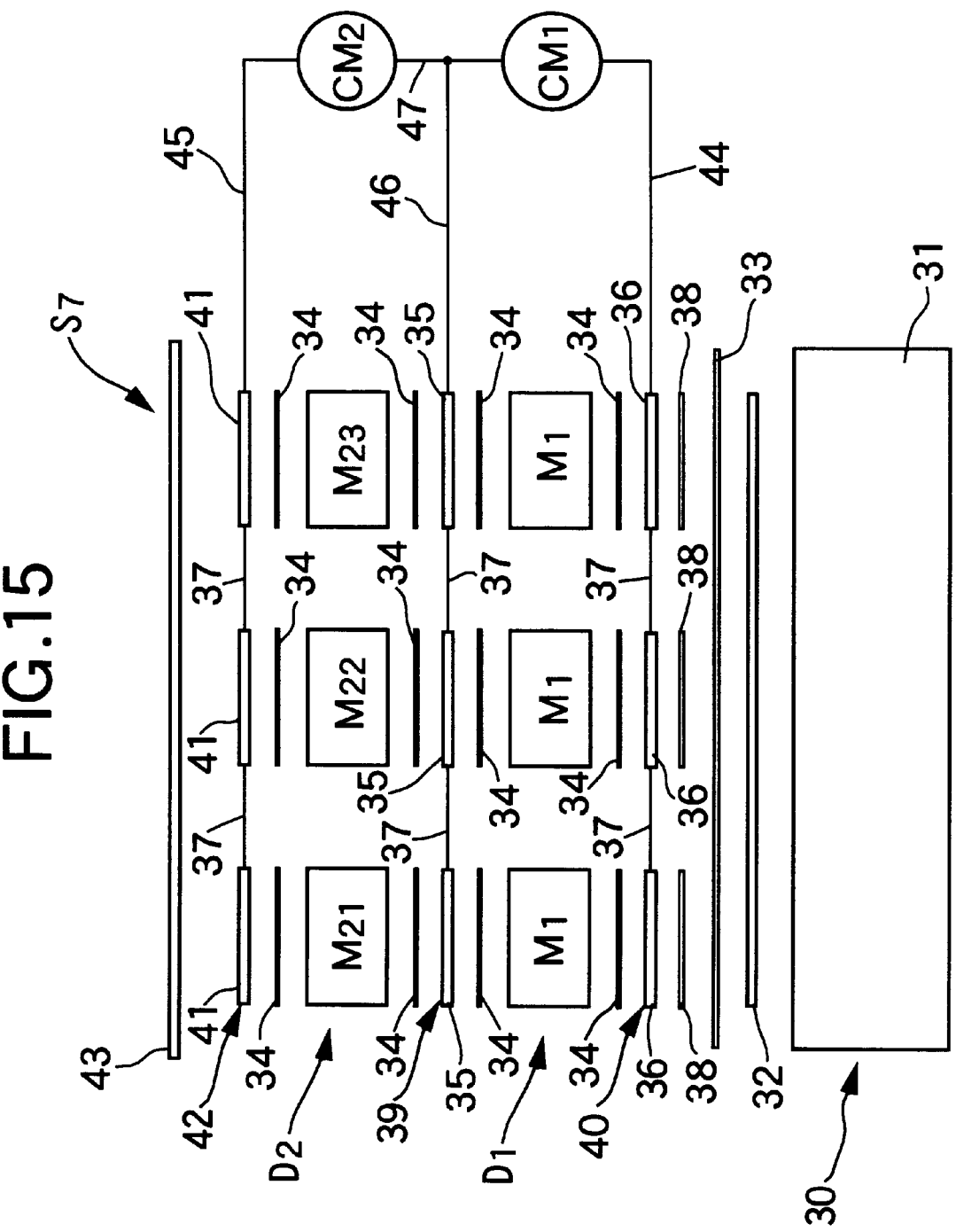
FIG. 15 is an exploded view of the sixth example of the piezoelectric load sensor.

A piezoelectric load sensor $S_7$ shown in FIGS. 14 and 15 includes a first detector $D_1$ disposed on a base 30 and having a piezoelectric constant which is uniform over the entire area of the detector. A second detector $D_2$ is laminated on the first detector $D_1$ and has a piezoelectric constant which gradually decreases from one end toward the other end thereof in a direction intersecting a direction of lamination, e.g., from a left end to a right end thereof in this example. A ratio $Q_2/Q_1$ of output values $Q_1$ and $Q_2$ from the first and second detectors $D_1$ and $D_2$ is used for the detection of a load-applied position, and the output value $Q_1$ from the first detector $D_1$ is used for the detection of a load.

The base 30 comprises an aluminum plate 31, and a sheet 33 made of polyvinyl chloride which is affixed to an upper surface of the aluminum plate 31 with an adhesive sheet 32 interposed therebetween.

The first detector $D_1$ comprises a plurality of, e.g., three (in this example) disk-shaped piezoelectric elements $M_1$ having a uniform piezoelectric constant, an intermediate copper foil 35 and a lower copper foil 36 which are affixed to upper and lower end faces of each of the piezoelectric elements $M_1$ with a conductive paste 34 interposed therebetween, respectively, and conductive wires 37 for connecting the adjacent intermediate copper foils 35 to each other and the adjacent lower copper foils 36 to each other.

The lower copper foils 36 are affixed to the sheet 33 with adhesive sheets 38 interposed therebetween. The three intermediate copper foils 35 and the two conductive wires 37 constitute an intermediate conductor 39. The three lower copper foils 36 and the two conductive wires 37 constitute a lower conductor 40.

The second detector $D_2$ comprises a plurality of, e.g., three (in this example) disk-shaped first, second and third piezoelectric elements $M_{21}$, $M_{22}$ and $M_{23}$ having different piezoelectric constants, an upper copper foil 41 and the intermediate copper foil 35 which are affixed to upper and lower end faces of each of the piezoelectric elements $M_{21}$, $M_{22}$ and $M_{23}$ with the conductive pastes 34 interposed therebetween, respectively, and conductive wires 37 connecting the adjacent upper copper foils 41 to each other and the adjacent intermediate copper foils 35 to each other.

In this way, the intermediate conductor 39 is used commonly in the first and second detectors $D_1$ and $D_2$ in this example. On the other hand, the three upper copper foils 41 and the two conductive wires 37 constitute an upper conductor 42. A sheet 43 of polyvinyl chloride is placed onto the upper copper foils 41 so as to cover them.

A lead wire 44 is connected to the lower copper foil 36 located at a right end in FIG. 14 and 15 and is also connected to a terminal of a first coulomb meter $CM_1$. A lead wire 45 is connected to the upper copper foil 41 located at the right end and is also connected to a terminal of a second coulomb meter $CM_2$. Further, a lead wire 46 is connected to the intermediate copper foil 35 located at the right end and is also connected to a conductive wire 47 between the terminals of the first and second coulomb meters $CM_1$ and $CM_2$.

The piezoelectric constant of each piezoelectric element $M_1$ in the first detector $D_1$ is uniform and is represented by $d_1$. If the piezoelectric constants of the first, second and third piezoelectric elements $M_{21}$, $M_{22}$ and $M_{23}$ in the second detector $D_2$ are represented by $d_{21}$, $d_{22}$ and $d_{23}$, a relationship, $d_{21} > d_{22} > d_{23}$ is established. Here, the piezoelectric constant is a value calculated from an amount of electricity (a charge) generated in a polarizing direction, when a load is applied to the piezoelectric element in the polarizing direction. The same is true in the description which will be made below.

For example, if it is supposed that a load F (N) has been applied to a position $P_0$ of the first piezoelectric element $M_{21}$, an amount of electricity (an output value) $Q_1 = d_1 \cdot F$ is measured by the first coulomb meter $CM_1$, and an amount of electricity (an output value) $Q_2 = d_{21} \cdot F$ is measured by the second coulomb meter $CM_2$. From these equations, $Q_1/d_1 = Q_2/d_{21}$ is established, and hence, if this is rearranged, $Q_2/Q_1 = d_{21}/d_1$ is given. Therefore, if a ratio $d_{21}/d_1$ of the piezoelectric constants $d_{21}$ and $d_1$ which are known values, namely, a theoretical electricity amount ratio $Q_2/Q_1$ in the position $P_0$ is previously determined from the piezoelectric constants $d_{21}$ and $d_1$, a load can be detected as being applied to the position $P_0$ of the first piezoelectric element $M_{21}$, by comparing the theoretical electricity amount ratio $Q_2/Q_1$ with a calculated electricity amount ratio $Q_2/Q_1$ resulting from measured electricity amounts $Q_1$ and $Q_2$. The theoretical electricity amount ratio $Q_2/Q_1$ is varied in the positions $P_0$ to $P_2$ of the first to third piezoelectric elements $M_{21}$ to $M_{23}$ due to the gradual decrease in the piezoelectric constant and hence, the detection of the load-applied position can be carried out in other positions $P_1$ and $P_2$ in a manner similar to that described above.

From the above-described equation $Q_1 = d_1 \cdot F$, the load F (N) is represented by $F = Q_1/d_1$. Therefore, even if a load is applied to any of the positions $P_0$ to $P_2$ of the first to third piezoelectric elements $M_{21}$ to $M_{23}$, the load can be detected using this equation. In this case, the unit of the load F is N, and hence, to convert the load (N) into the load W having a unit of kg, $W = F/g$ (g:9.8 m/sec$^2$, i.e., acceleration of gravity) may be used. Therefore, W (kg)=$Q_1/(d_1 \cdot g)$ is given.

The materials for forming the piezoelectric element include perovskite-type ferroelectric materials such as $BaTiO_3$, $Pb(ZrTi)O_3$, $KNbO_3$, $SrTiO_3$, $Pb(MgNb)O_3$ and the like, $LiNbO_3$-type ferroelectric materials such as $LiNbO_3$, $LiTaO_3$ and the like, tungsten bronze-type ferroelectric materials such as $K_3Li_2Nb_5O_{15}$, $Ba_2NaNb_5O_{15}$ and the like, and the materials having a piezoelectric property such as quartz ($\alpha$-$SiO_2$), ZnO, berlinite ($\alpha$-$AlPO_4$), Rochelle salt, PVDF and the like. These materials are usually used alone, but may be used in combination with one another. Any of these materials (including a combination) can be combined with any material having a rubber elasticity or any material having a lower modulus of elasticity such as polymers to produce a soft piezoelectric element.

Particular examples will be described below.

Figure 16:
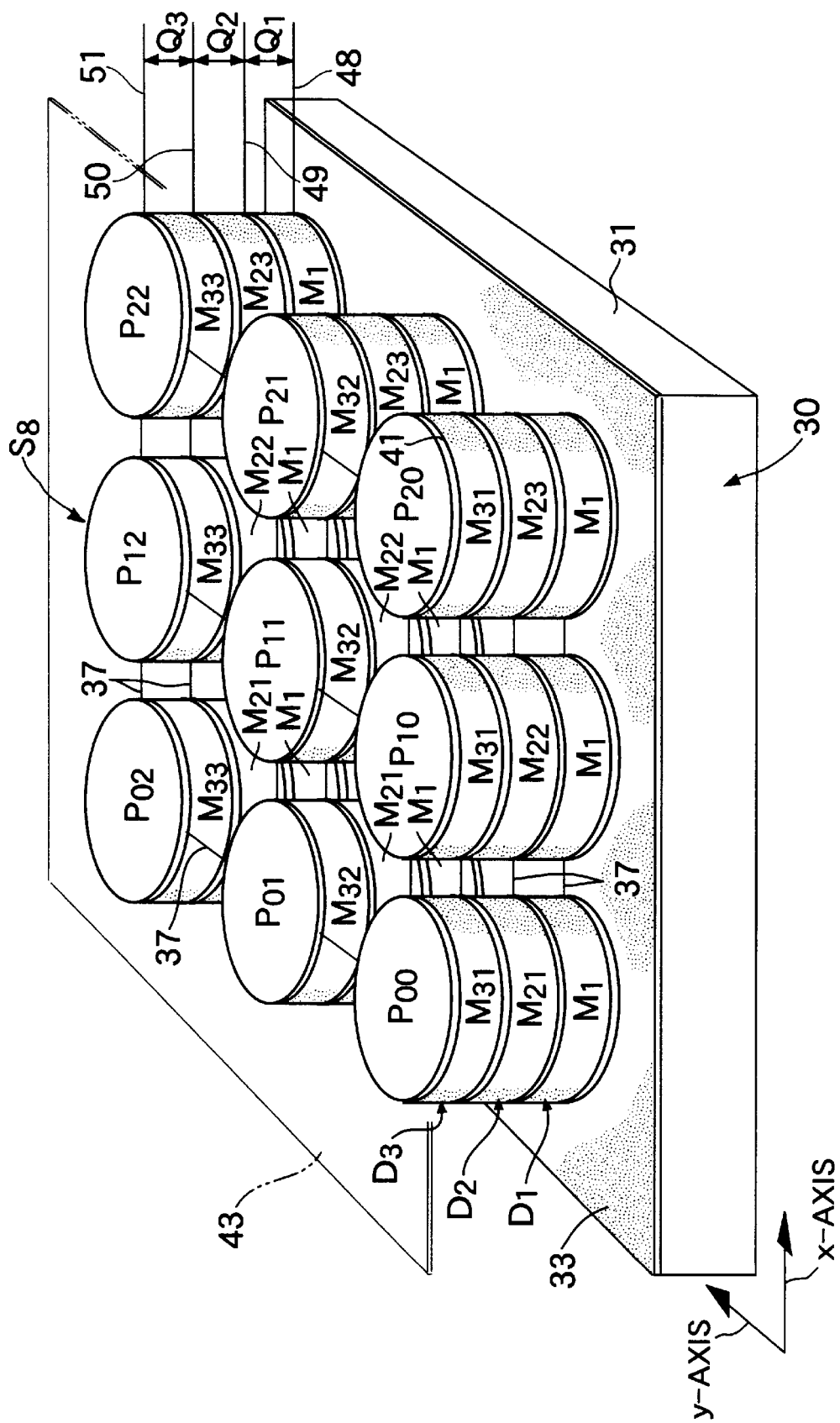
FIG. 16 is a perspective view of a seventh example of a piezoelectric load sensor.
Figure 17:
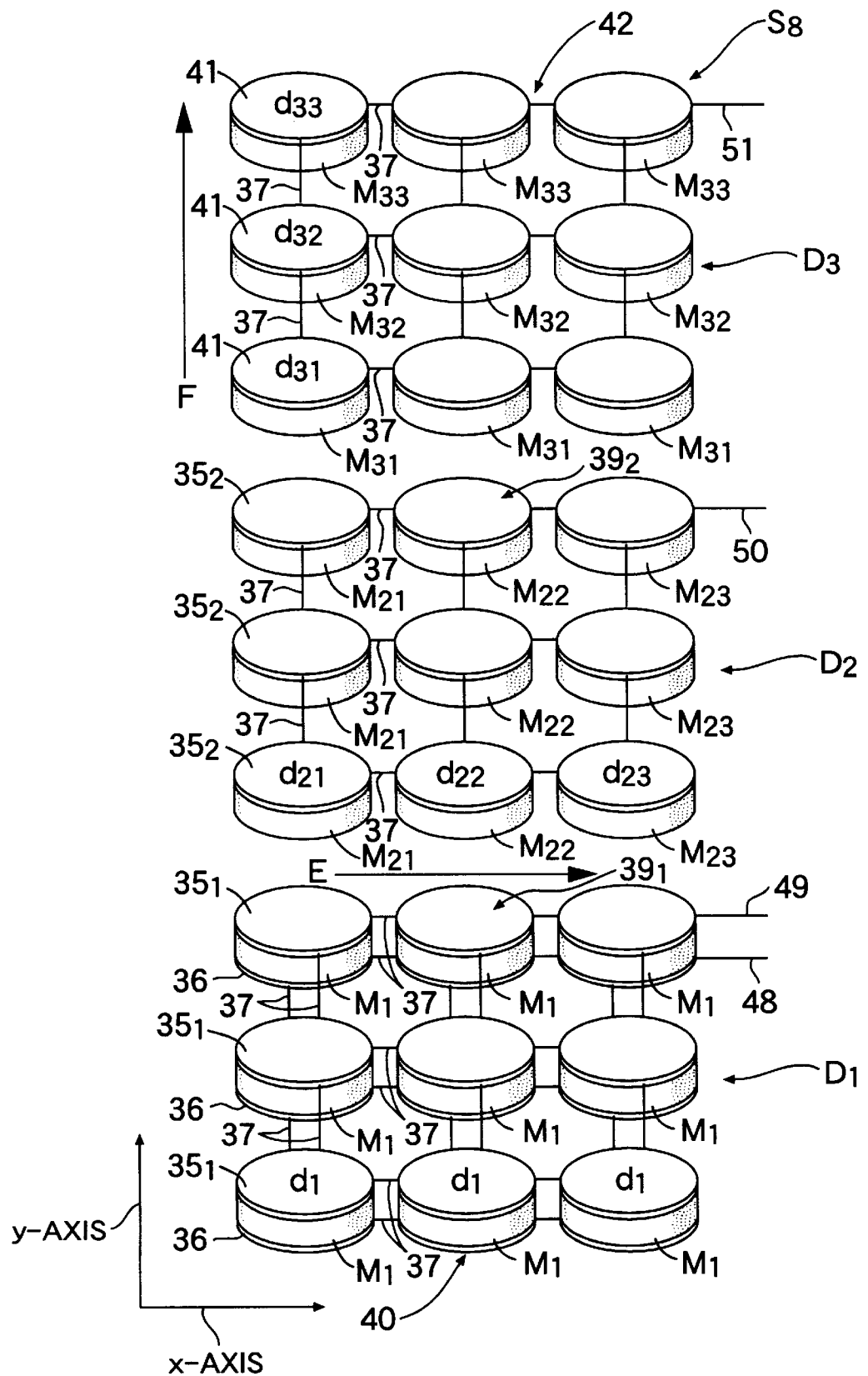
FIG. 17 is an exploded perspective view of the seventh example of the piezoelectric load sensor.

A piezoelectric load sensor $S_8$ shown in FIGS. 16 and 17 is disposed on a base 1 and has a structure in which first, second and third detectors $D_1$ to $D_3$ are laminated one on another.

The first detector $D_1$ has a piezoelectric constant which is uniform over the entire area of the detector. The second detector $D_2$ has a piezoelectric constant which gradually decreases from one end toward the other end in a direction intersecting a direction of lamination, e.g., from a left end toward a right end thereof in this example. The third detector $D_3$ has a piezoelectric constant which gradually decreases from one end toward the other end in a direction intersecting a direction of lamination, e.g., from one side toward the other side in FIGS. 16 and 17, namely, a direction F of gradual decrease of the piezoelectric constant of the third detector $D_3$ intersects a direction E of gradual decrease of the piezoelectric constant of the second detector $D_2$. A ratio $Q_2/Q_1$ of output values $Q_1$, and $Q_2$ from the first and second detectors $D_1$ and $D_2$ is used for the detection of the load-applied position in the direction E of gradual decrease of the piezoelectric constant of the second detector $D_2$; a ratio $Q_3/Q_1$ of output values $Q_1$ and $Q_3$ from the first and third detectors $D_1$ and $D_3$ is used for the detection of the load-applied position in the direction F of gradual decrease of the piezoelectric constant of the third detector $D_3$; and the output value $Q_1$ from the first detector $D_1$ is used for the detection of the load in each of the load-applied positions.

The construction of the base 30 is the same as that described above, and a sheet 43 made of polyvinyl chloride is placed onto the load sensor $S_8$ in the same manner as that described above.

The first detector $D_1$ is constructed specifically as follows: A plurality of, e.g., nine (in this example) disk-shaped piezoelectric elements $M_1$ having the same piezoelectric constant $d_1$ are arranged at a predetermined distance between the adjacent elements and in three rows (each row comprises three elements). A first intermediate copper foil $35_1$ and a lower copper foil 36 are affixed to upper and lower end faces of each of the piezoelectric elements $M_1$ with conductive pastes interposed therebetween, respectively. The adjacent first intermediate copper foils $35_1$ as well as the adjacent lower copper foils 36 are connected to each other by a conductive wire 37. The nine lower copper foils 36 and the ten conductive wires 37 constitute a lower conductor 40. The nine first intermediate copper foils $35_1$ and the ten conductive wires 37 constitute a first intermediate conductor $39_1$.

The second detector $D_2$ is constructed specifically as follows: A plurality of, e.g., nine (in this example) disk-shaped piezoelectric elements $M_{21}$ to $M_{23}$ having different piezoelectric constants are arranged at a predetermined distance between the adjacent elements and in three rows (each row comprises three elements), as in the first detector $D_1$. In the piezoelectric elements $M_{21}$ to $M_{23}$, the left-hand three elements in FIG. 17 are referred to as first piezoelectric elements $M_{21}$; the intermediate three elements are referred to as second piezoelectric elements $M_{22}$; and the right-hand three elements are referred to as third piezoelectric elements $M_{23}$.

If the piezoelectric constants of the first, second and third piezoelectric elements $M_{21}$, $M_{22}$ and $M_{23}$ are represented by $d_{21}$, $d_{22}$ and $d_{23}$, a relationship, $d_{21}>d_{22}>d_{23}$ is established. A second intermediate copper foil $35_2$ and the first intermediate copper foil $35_1$ are affixed to upper and lower end faces of each of the piezoelectric elements $M_{21}$ to $M_{23}$ with conductive pastes interposed therebetween, respectively. The adjacent second intermediate copper foils $35_2$ are connected to each other by the conductive wire 37. The nine second intermediate copper foils $35_2$ and the ten conductive wires 37 constitute a second intermediate conductor $39_2$. The first intermediate conductor $39_1$ is used commonly in the first and second detectors $D_1$ and $D_2$.

The third detector $D_3$ is constructed specifically as follows: A plurality of, e.g., nine (in this example) disk-shaped piezoelectric elements $M_{31}$ to $M_{33}$ having different piezoelectric constants are arranged at a predetermined distance between the adjacent elements and in three rows (each row comprises three elements) as in the first detector $D_1$. In these piezoelectric elements $M_{31}$ to $M_{33}$, the three elements on one side in FIG. 17 are referred to as first piezoelectric elements $M_{31}$; the intermediate three elements are referred to as second piezoelectric elements $M_{32}$; and the three elements on the other side are referred to as third piezoelectric elements $M_{33}$.

If the piezoelectric constants of the first, second and third piezoelectric elements $M_{31}$, $M_{32}$ and $M_{33}$ are represented by $d_{31}$, $d_{32}$ and $d_{33}$, a relationship, $d_{31}>d_{32}>d_{33}$ is established. An upper copper foil 41 and a second intermediate copper foil $35_2$ are affixed to upper and lower end faces of each of the piezoelectric elements $M_{31}$ to $M_{33}$ with conductive pastes interposed therebetween, respectively. The adjacent upper copper foils 41 are connected to each other by the conductive wire 37. The nine upper copper foils 41 and the ten conductive wires 37 constitute an upper conductor 42. The second intermediate conductor $39_2$ is used commonly in the second and third detector $D_2$ and $D_3$.

In a piezoelectric element laminate located at one corner and comprising the three piezoelectric elements, lead wires 48, 49, 50 and 51 are connected to the four copper foils 36, $35_1$, $35_2$ and 41, respectively, so that amounts of electricity $Q_1$ to $Q_3$ generated between the adjacent lead wires 48 and 49; 49 and 50; and 50 and 51 can be measured by a means similar to that described above.

The composition and piezoelectric constants of the piezoelectric element $M_1$ in the first detector $D_1$ and the first to third piezoelectric elements $M_{21}$, $M_{31}$ to $M_{23}$ and $M_{33}$ in the second and third detectors $D_2$ and $D_3$ are as shown in Table 9.

TABLE 9

|  |  | Composition | Piezoelectric constant(pC/N) |
|---|---|---|---|
| First detector | Piezoelectric element | $Pb(Zr_{0.5}Ti_{0.5})O_3$ | 97.8 ($d_1$) |
| Second detector and third detector | First piezoelectric element | $Pb(Zr_{0.52}Ti_{0.48})O_3$ | 142.5 ($d_{21},d_{31}$) |
|  | Second piezoelectric element | $Pb(Zr_{0.5}Ti_{0.5})O_3$ | 97.8 ($d_{22},d_{32}$) |
|  | Third piezoelectric element | $Pb(Zr_{0.48}Ti_{0.52})O_3$ | 61.7 ($d_{23},d_{33}$) |

As apparent from Table 9, each of the piezoelectric elements $M_1$ of the first detector $D_1$ has the same composition and the same piezoelectric constant as those of each of the second piezoelectric elements $M_{22}$ and $M_{32}$ of the second and third detectors $D_2$ and $D_3$, and the first to third piezoelectric elements $M_{21}$ to $M_{23}$ of the second detector $D_2$ have the same composition and the same piezoelectric constant as those of the first to third piezoelectric elements $M_{31}$ to $M_{33}$ of the third detector $D_3$. Therefore, the third detector $D_3$ has the same structure as that in which the second detector $D_2$ is rotated through 90° in a counterclockwise direction in a horizontal plane in FIG. 17.

When the load-applied positions P of the piezoelectric element laminates are represented in x-y coordinates by taking an x-axis for the direction E of gradual decrease of the piezoelectric constants of the first to third piezoelectric elements $M_{21}$ to $M_{23}$ in the second detector $D_2$ and taking a y-axis for the direction F of gradual decrease of the piezoelectric constants of the first to third piezoelectric elements $M_{31}$ to $M_{33}$ in the third detector $D_3$, theoretical electricity amount ratios $Q_2/Q_1$ and $Q_3/Q_1$ in the load-applied positions Pxy are calculated to give values shown in Table 10.

TABLE 10

| Load-applied position Pxy | Theoretical electricity amount ratio | | | |
|---|---|---|---|---|
| | $Q_2/Q_1$ | | $Q_3/Q_1$ | |
| $P_{00}$ | 1.46 | $d_{21}/d_1$ | 1.46 | $d_{31}/d_1$ |
| $P_{01}$ | 1.46 | | 1.00 | $d_{32}/d_1$ |
| $P_{02}$ | 1.46 | | 0.63 | $d_{33}/d_1$ |
| $P_{10}$ | 1.00 | $d_{22}/d_1$ | 1.46 | $d_{31}/d_1$ |
| $P_{11}$ | 1.00 | | 1.00 | $d_{32}/d_1$ |
| $P_{12}$ | 1.00 | | 0.63 | $d_{33}/d_1$ |
| $P_{20}$ | 0.63 | $d_{23}/d_1$ | 1.46 | $d_{31}/d_1$ |
| $P_{21}$ | 0.63 | | 1.00 | $d_{32}/d_1$ |
| $P_{22}$ | 0.63 | | 0.63 | $d_{33}/d_1$ |

Loads (actual loads) of 1.0 kg, 2.0 kg, 5.0 kg and 10.0 kg were applied to the load-applied position $P_{00}$, and generated electricity amounts $Q_1$ to $Q_3$ were measured for every load. Generated electricity amount ratios $Q_2/Q_1$ and $Q_3/Q_1$ were calculated based on the measured values, and a load W was calculated using the above-described equation $W=Q_1/(d_1 \cdot g)$. The measurements and calculations similar to those just described above were carried out for the four load-applied positions $P_{10}$, $P_{20}$, $P_{21}$ and $P_{22}$.

Table 11 shows results of these measurements and calculations. In Table 11, the unit of the generated electricity amounts $Q_1$ to $Q_3$ is nC (nano Coulomb), and the unit of the load W is kg.

If the calculated electricity amount ratios $Q_2/Q_1$ from the measured values shown in Table 3 are compared with the theoretical electricity amount ratios $Q_2/Q_1$ with respect to the load-applied positions $P_{00}$; $P_{10}$; $P_{20}$; $P_{21}$ and $P_{22}$ and thus, for x=0; x=1; x=2, and the calculated electricity amount ratios $Q_3/Q_1$ from the measured values shown in Table 11 are compared with the theoretical electricity amount ratios Q3/Q1 with respect to the load-applied positions $P_{00}$; $P_{10}$; $P_{20}$; $P_{21}$ and $P_{22}$ and thus, for y=0; y=1; y=2, the results are as shown in Table 12.

TABLE 12

| Load-applied position | Theoretical value | Calculated value | | |
|---|---|---|---|---|
| | | Average value | Minimum value | Maximum value |
| | | $Q_2/Q_1$ | | |
| x = 0 ($P_{00}$) | 1.46 | 1.41 | 1.32 | 1.49 |
| x = 1 ($P_{10}$) | 1.00 | 1.03 | 0.97 | 1.09 |
| x = 2 ($P_{20}$, $P_{21}$, $P_{22}$) | 0.63 | 0.66 | 0.54 | 0.78 |
| | | $Q_3/Q_1$ | | |
| y = 0, ($P_{00}$, $P_{10}$, $P_{20}$) | 1.46 | 1.44 | 1.32 | 1.56 |
| y = 1, ($P_{21}$) | 1.00 | 1.01 | 0.93 | 1.09 |
| y = 2 ($P_{22}$) | 0.63 | 0.63 | 0.61 | 0.65 |

Figure 18:
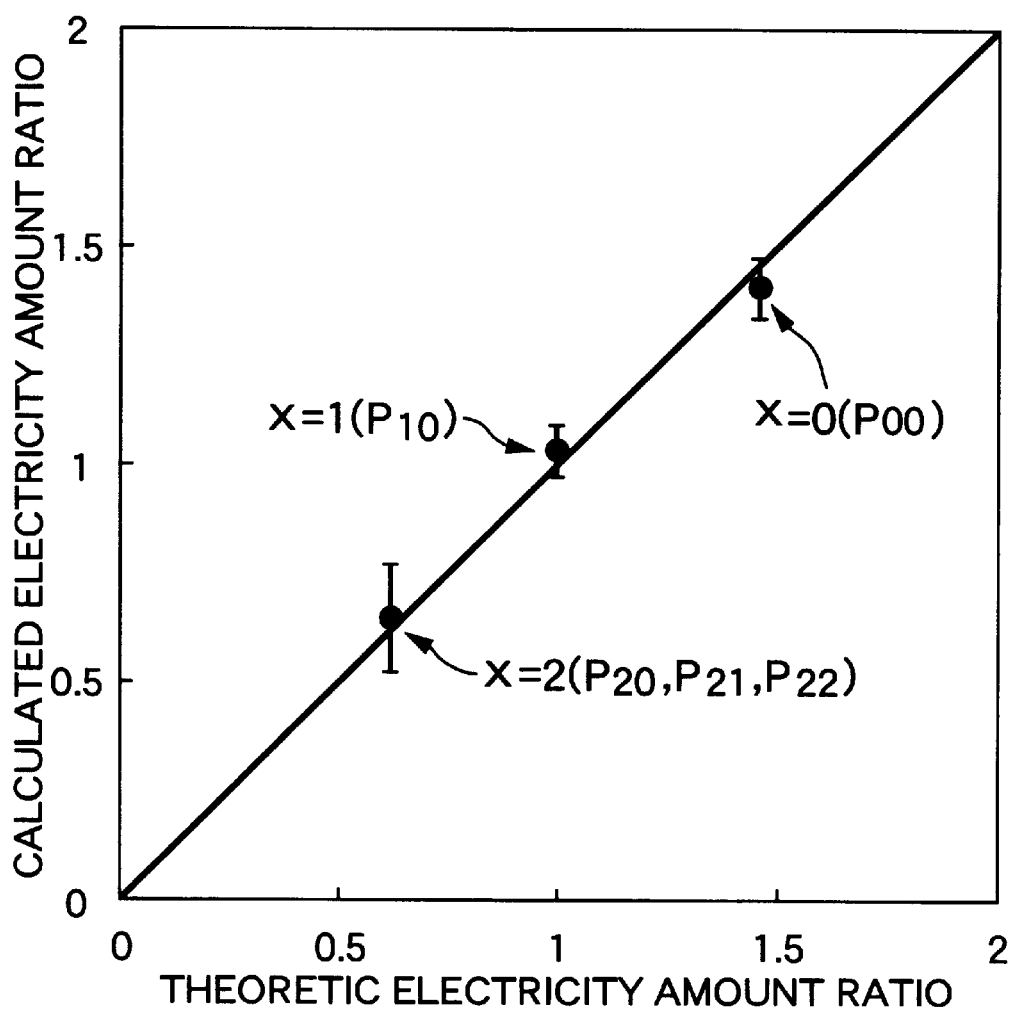
FIG. 18 is a graph showing the relationship between the theoretical electricity amount ratio and the calculated electricity amount ratio.

FIG. 18 is a graph taken from Table 12 and illustrating the relationship between the theoretical electricity amount ratio and the calculated electricity amount ratio for x=0, 1 and 2.

As apparent from Table 12 and FIG. 18, the theoretical electricity amount ratio and the calculated electricity amount ratio are substantially matched with each other and therefore, the load-applied position in the direction of the x-axis can be detected based on the calculated electricity amount ratio $Q_2/Q_1$, and the load-applied position in the direction of the y-axis can be detected based on the calculated electricity amount ratio $Q_3/Q_1$. Namely, the load-applied position can be detected in a two-dimensional manner by the load sensor S8.

TABLE 11

| Load-applied position Pxy | Load (kg) | Generated electricity amount (nC) | | | $Q_2/Q_1$ | | $Q_3/Q_1$ | | Calculated load W (kg) |
|---|---|---|---|---|---|---|---|---|---|
| | | $Q_1$ | $Q_2$ | $Q_3$ | Calculated value | Theoretical value | Calculated value | Theoretical value | |
| $P_{00}$ | 1.0 | 0.97 | 1.28 | 1.38 | 1.32 | 1.46 | 1.42 | 1.46 | 1.01 |
| | 2.0 | 1.88 | 2.80 | 2.48 | 1.49 | | 1.32 | | 1.96 |
| | 5.0 | 4.78 | 6.69 | 6.46 | 1.40 | | 1.35 | | 4.99 |
| | 10.0 | 9.19 | 13.25 | 13.87 | 1.44 | | 1.51 | | 9.59 |
| $P_{10}$ | 1.0 | 0.99 | 0.96 | 1.32 | 0.97 | 1.00 | 1.33 | 1.46 | 1.03 |
| | 2.0 | 1.88 | 2.04 | 2.62 | 1.09 | | 1.39 | | 1.96 |
| | 5.0 | 4.62 | 4.64 | 6.78 | 1.00 | | 1.47 | | 4.82 |
| | 10.0 | 9.59 | 9.89 | 13.73 | 1.03 | | 1.43 | | 10.00 |
| $P_{20}$ | 1.0 | 0.98 | 0.56 | 1.53 | 0.57 | 0.63 | 1.56 | 1.46 | 1.02 |
| | 2.0 | 1.94 | 1.06 | 2.88 | 0.55 | | 1.48 | | 2.02 |
| | 5.0 | 4.85 | 3.05 | 6.71 | 0.63 | | 1.38 | | 5.06 |
| | 10.0 | 9.66 | 5.80 | 13.48 | 0.60 | | 1.40 | | 10.08 |
| $P_{21}$ | 1.0 | 1.01 | 0.60 | 0.94 | 0.60 | 0.63 | 0.93 | 1.00 | 1.05 |
| | 2.0 | 1.89 | 1.28 | 2.06 | 0.68 | | 1.09 | | 1.97 |
| | 5.0 | 5.20 | 2.82 | 5.09 | 0.54 | | 0.98 | | 5.43 |
| | 10.5 | 10.37 | 6.05 | 10.04 | 0.58 | | 0.97 | | 10.82 |
| $P_{22}$ | 1.0 | 0.90 | 0.61 | 0.57 | 0.68 | 0.63 | 0.63 | 0.63 | 0.94 |
| | 2.0 | 1.86 | 1.32 | 1.20 | 0.71 | | 0.65 | | 1.94 |
| | 5.0 | 4.28 | 3.35 | 2.79 | 0.78 | | 0.65 | | 4.47 |
| | 10.5 | 8.72 | 6.31 | 5.33 | 0.72 | | 0.61 | | 9.10 |

The comparison of the actual loads and the calculated loads W in Table 11 is as shown in Table 13.

TABLE 13

| Actual load | Calculated load W (kg) | | |
|---|---|---|---|
| (kg) | Average value | Minimum value | Maximum value |
| 1.0 | 1.00 | 0.94 | 1.05 |
| 2.0 | 1.98 | 1.94 | 2.02 |
| 5.0 | 4.95 | 4.47 | 5.43 |
| 10.0 | 9.96 | 9.10 | 10.82 |

Figure 19:
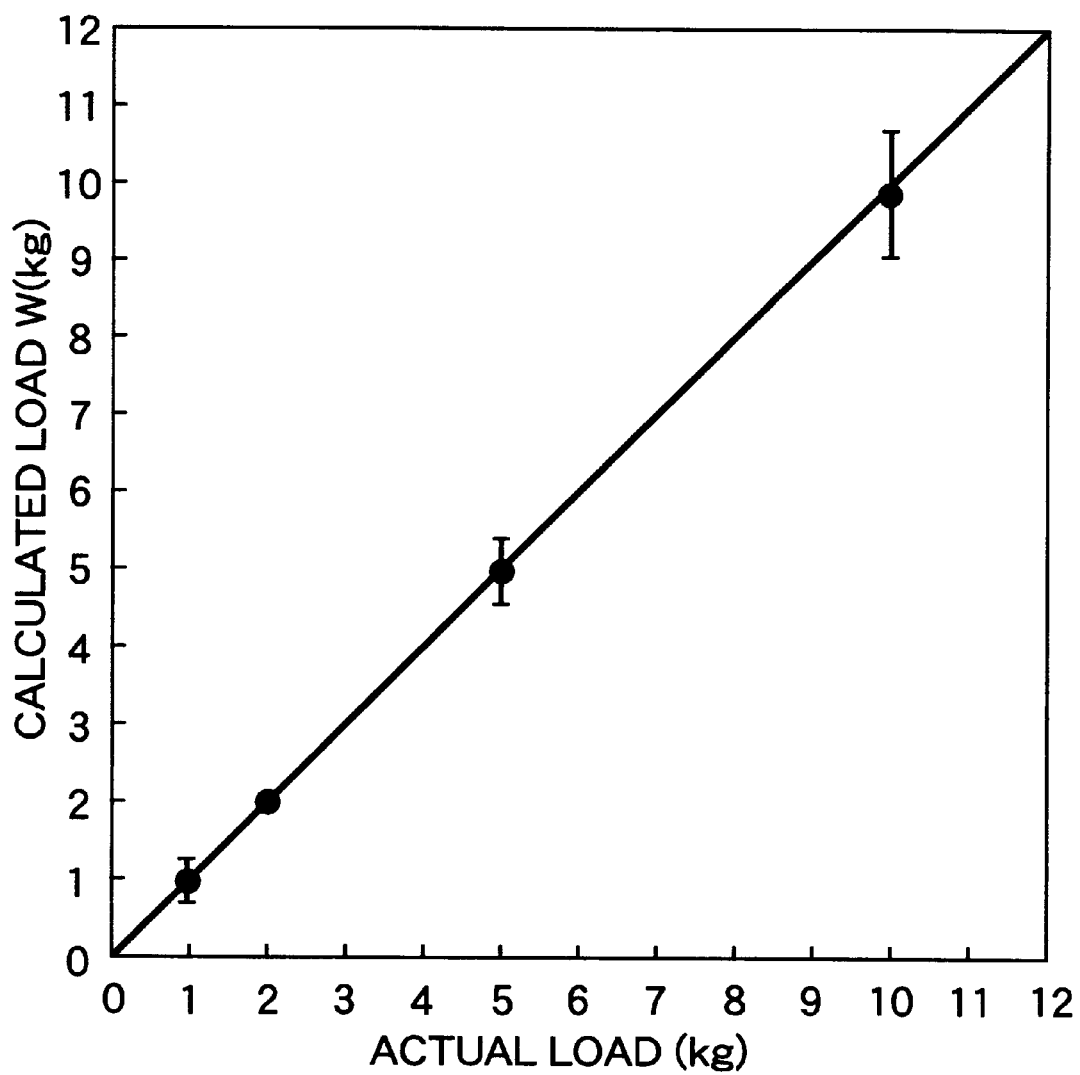
FIG. 19 is a graph showing the relationship between the actual load and the calculated load.

FIG. 19 is a graph taken from Table 13 and illustrating the relationship between the actual load and the calculated load. As apparent from Table 13 and FIG. 19, the actual load and the calculated load are substantially matched with each other. Thus, it is sufficiently possible to carry out the detection of the load.

The positions of the first to third detectors $D_1$ to $D_3$ in the direction of lamination are not limited to those in the above-described specific example. The piezoelectric elements which can be used are, for example, a rectangular parallelepiped-shaped assembly formed from all the three piezoelectric elements $M_1$ of the first detector $D_1$ and all the three piezoelectric elements $M_{21}$ to $M_{23}$ of the second detector $D_2$ in FIG. 14 by bringing them together, and a flat plate-shaped assembly formed from all the nine piezoelectric elements $M_1$ of the first detector $D_1$ in FIG. 17, all the nine piezoelectric elements $M_{21}$ to $M_{23}$ of the second detector $D_2$, and all the nine piezoelectric elements $M_{31}$ to $M_{33}$ of the third detector $D_3$ by bringing them together. The piezoelectric elements which can also be used also include those having a rectangular parallelepiped-shape, a flat plate-formed shape and the like and having a piezoelectric constant which gradually rectilinearly decreases from one end toward the other.

Although the embodiment of the present invention has been described in detail, various modifications may be made without departing from the spirit and scope of the invention.

What is claimed is:

1. A piezoelectric load sensor comprising:
   an upper conductor,
   a lower conductor,
   an intermediate conductor located between said upper and lower conductors,
   a plurality of upper piezoelectric elements interposed between said upper and intermediate conductors and arranged in a row, and
   a plurality of lower piezoelectric elements interposed between said lower and intermediate conductors and arranged in a row,
   piezoelectric constants of said plurality of upper piezoelectric elements being set to gradually decrease from an upper piezoelectric element located at one end in a direction of arrangement of the upper piezoelectric elements toward an upper piezoelectric element located at the other end in said direction of arrangement of the upper piezoelectric elements, and
   piezoelectric constants of said plurality of lower piezoelectric elements being set to gradually increase from a lower piezoelectric element located at one end in a direction of arrangement of the lower piezoelectric elements toward a lower piezoelectric element located at the other end in said direction of arrangement of the lower piezoelectric elements.

2. A piezoelectric load sensor according to claim 1, wherein an order of arrangement of said plurality of lower piezoelectric elements is a same as an order of arrangement provided when said plurality of upper piezoelectric elements are rotated through 180° in a horizontal plane.

3. A piezoelectric load sensor according to claim 1 or 2, wherein a sum of voltages generated by one of said upper piezoelectric elements and one of said lower piezoelectric elements which is opposed to said one upper piezoelectric element in a state in which a given load is applied to the one upper and lower piezoelectric elements is equal to a sum of voltages generated by any other one of said upper piezoelectric elements and any other one of said lower piezoelectric elements which is opposed to said any other one upper piezoelectric element in a state in which said given load is applied to said any other one upper and lower piezoelectric elements.

4. A piezoelectric load sensor comprising:
   a lower piezoelectric unit group including a plurality of lower piezoelectric units each comprised of an upper conductor, a lower conductor and a plurality of upper and lower piezoelectric elements interposed between said upper and lower conductors and arranged in a row, a plurality of upper piezoelectric elements located above said upper conductor and arranged in a row, piezoelectric constants of said plurality of upper piezoelectric elements being set to gradually decrease from an upper piezoelectric element located at one end in a direction of arrangement of the upper piezoelectric elements toward an upper piezoelectric element located at the other end in said direction of arrangement of the upper piezoelectric elements, and piezoelectric constants of said plurality of lower piezoelectric elements being set to gradually increase from a lower piezoelectric element located at one end in a direction of arrangement of the lower piezoelectric elements toward a lower piezoelectric element located at the other end in said direction of arrangement of the lower piezoelectric elements, said plurality of lower piezoelectric units being arranged in a row, wherein said upper piezoelectric elements of said lower piezoelectric units, which have maximum piezoelectric constants, are adjacent to each other, and adjacent conductors being electrically connected to each other;
   a plurality of intermediate conductors disposed on the lower piezoelectric units of said lower piezoelectric unit group;
   means for electrically connecting adjacent ones of the intermediate conductors;
   an upper piezoelectric unit group including a plurality of upper piezoelectric units each comprised of an upper conductor, a lower conductor, a plurality of upper piezoelectric elements interposed between said upper and lower conductors and arranged in a row, and a plurality of lower piezoelectric elements located below said lower conductor and arranged in a row, piezoelectric constants of said plurality of upper piezoelectric elements being set to gradually decrease from an upper piezoelectric element located at one end in a direction of arrangement of the upper piezoelectric elements toward an upper piezoelectric element located at the other end in said direction of arrangement of the upper piezoelectric elements, and piezoelectric constants of said plurality of lower piezoelectric elements being set to gradually increase from a lower piezoelectric element located at one end in a direction of arrangement of the lower piezoelectric elements toward a lower piezoelectric element located at the other end in said direction of arrangement of the lower piezoelectric elements, said plurality of upper piezoelectric units being arranged in a row, wherein said upper piezoelectric elements of said upper piezoelectric units, which have maximum piezoelectric constants, are adjacent to each other, adjacent conductors being electrically connected to each other, and said upper piezoelectric unit group being superposed on said lower piezoelectric unit group with said intermediate conductors interposed therebetween;

a direction of arrangement of said upper piezoelectric units and a direction of arrangement of said lower piezoelectric units being in an intersecting relationship to each other.

5. A piezoelectric load sensor according to claim 4, wherein an order of arrangement of said upper and lower piezoelectric elements in said upper piezoelectric units of said upper piezoelectric unit group is a same as an order of arrangement of said upper and lower piezoelectric elements in said lower piezoelectric units of said lower piezoelectric unit group when said lower piezoelectric unit group is rotated through 90° in a horizontal plane.

6. A piezoelectric load sensor comprising:

a lower piezoelectric unit including an upper conductor, a lower conductor, a plurality of rectangular parallelepiped-shaped lower piezoelectric elements interposed between said upper and lower conductors and arranged in a row, and a plurality of rectangular parallelepiped-shaped upper piezoelectric elements located above said upper conductor and arranged in a row in a same direction as said lower piezoelectric elements, piezoelectric constants of said plurality of upper piezoelectric elements being set to gradually decrease from an upper piezoelectric element located at one end in a direction of arrangement of the upper piezoelectric elements toward an upper piezoelectric element located at the other end in said direction of arrangement of the upper piezoelectric elements, and piezoelectric constants of said plurality of lower piezoelectric elements being set to gradually increase from a lower piezoelectric element located at one end in a direction of arrangement of the lower piezoelectric elements toward a lower piezoelectric element located at the other end in said direction of arrangement of the lower piezoelectric elements;

an intermediate conductor disposed on said lower piezoelectric unit;

an upper piezoelectric unit including an upper conductor, a lower conductor, a plurality of rectangular parallelepiped-shaped upper piezoelectric elements interposed between said upper and lower conductors and arranged in a row, and a plurality of rectangular parallelepiped-shaped lower piezoelectric elements located below said lower conductor and arranged in a row in a same direction as said upper piezoelectric elements, piezoelectric constants of said plurality of upper piezoelectric elements being set to gradually decrease from an upper piezoelectric element located at one end in a direction of arrangement of the upper piezoelectric elements toward an upper piezoelectric element located at the other end in said direction of arrangement of the upper piezoelectric elements, and piezoelectric constants of said plurality of lower piezoelectric elements being set to gradually increase from a lower piezoelectric element located at one end in a direction of arrangement of the lower piezoelectric elements toward a lower piezoelectric element located at the other end in said direction of arrangement of the lower piezoelectric elements, and said upper piezoelectric unit being superposed on said lower piezoelectric unit with said intermediate conductor interposed therebetween;

the direction of arrangement of said upper and lower piezoelectric elements in said upper piezoelectric unit and the direction of arrangement of said upper and lower piezoelectric elements in said lower piezoelectric unit being in an intersecting relationship to each other.

7. A piezoelectric load-applied position sensor comprising:

an upper conductor, a lower conductor, an intermediate conductor located between said upper and lower conductors, a single upper piezoelectric element interposed between said upper and intermediate conductors, and a single lower piezoelectric element interposed between said lower and intermediate conductor, said upper piezoelectric element having a piezoelectric constant which gradually deceases from one end toward the other end thereof, and said lower piezoelectric element having a piezoelectric constant which gradually increases from one end toward the other end thereof, wherein a ratio of output values from said upper and lower piezoelectric elements is used for detection of a load-applied position.

8. A piezoelectric load sensor comprising:

a lower piezoelectric unit including an upper conductor, a lower conductor, a single flat plate-shaped lower piezoelectric element interposed between said upper and lower conductors, and a single flat plate-shaped upper piezoelectric element located above said upper conductor, said upper piezoelectric element having a piezoelectric constant which gradually decreases from one end edge toward the other end edge thereof, said lower piezoelectric element having a piezoelectric constant which gradually increases from one end edge, corresponding to said one end edge of said upper piezoelectric element, toward the other end edge corresponding to said other end edge of said upper piezoelectric element;

an intermediate conductor disposed on said lower piezoelectric unit; and an upper piezoelectric unit including an upper conductor, a lower conductor, a single flat plate-shaped upper piezoelectric element interposed between said upper and lower conductors, and a single flat plate-shaped lower piezoelectric element located below said lower conductor, said upper piezoelectric element having a piezoelectric constant which gradually decreases from one end edge toward the other end edge thereof, said lower piezoelectric element having a piezoelectric constant which gradually increases from one end edge, corresponding to said one end edge of said upper piezoelectric element, toward the other end edge corresponding to said other end edge of said upper piezoelectric element, and said upper piezoelectric unit being superposed on said lower piezoelectric unit with said intermediate conductor interposed therebetween;

the direction of gradual decrease and increase of the piezoelectric constants in said upper piezoelectric unit and the direction of gradual decrease and increase of the piezoelectric constants in said lower piezoelectric unit being in an intersecting relationship to each other.

9. A piezoelectric load sensor according to claim 8, wherein said lower piezoelectric element in said upper piezoelectric unit is a same as said upper piezoelectric element rotated through 180° in a horizontal plane, and said lower piezoelectric element in said lower piezoelectric unit is a same as said upper piezoelectric element rotated through 180° in a horizontal plane.

10. A piezoelectric load sensor according to claim 8 or 9, wherein said upper and lower piezoelectric elements of said upper piezoelectric unit are a same as the upper and lower piezoelectric elements of said lower piezoelectric unit arranged by rotating said lower piezoelectric unit through 90° in a horizontal plane.

11. A process for detecting a load-applied position using a piezoelectric load sensor which comprises an upper conductor, a lower conductor, an intermediate conductor located between said upper and lower conductors, a plurality of upper piezoelectric elements interposed between said upper and intermediate conductors and arranged in a row, a plurality of lower piezoelectric elements interposed between said lower and intermediate conductors and arranged in a row, piezoelectric constants of said plurality of upper piezoelectric elements being set to gradually decrease from an upper piezoelectric element located at one end in a direction of arrangement of the upper piezoelectric elements toward an upper piezoelectric element located at the other end in said direction of arrangement of the upper piezoelectric elements, piezoelectric constants of said plurality of lower piezoelectric elements being set to gradually increase from a lower piezoelectric element located at one end in a direction of arrangement of the lower piezoelectric elements toward a lower piezoelectric element located at the other end in said direction of arrangement of the lower piezoelectric elements, said process comprising the steps of:

applying a load to one of said upper piezoelectric elements and one of said lower piezoelectric elements which is opposed to said one upper piezoelectric element, and detecting a load-applied position based on a ratio of voltages generated by said one upper and lower piezoelectric elements.

12. A piezoelectric load sensor comprising:

first, second and third detectors laminated one on another, said first detector having a piezoelectric constant which is uniform over an entire area thereof, said second detector having piezoelectric constants which gradually decrease from one end toward the other end in a direction intersecting a direction of lamination thereof, said third detector having piezoelectric constants which gradually decrease from one end toward the other end in a direction intersecting a direction of lamination thereof, such that a direction of gradual decrease of the piezoelectric constants of said third detector intersects a direction of gradual decrease of the piezoelectric constants of said second detector, wherein a first ratio of output values from said first and second detectors is used for detection of a load-applied position in said direction of gradual decrease of the piezoelectric constants of said second detector, a second ratio of output values from said first and third detectors is used for detection of a load-applied position in said direction of gradual decrease of the piezoelectric constants of said third detector, and the output value from said first detector is used for detection of a load in each of said load-applied positions.

13. A piezoelectric load sensor according to claim 12, wherein said third detector has a same structure as a structure of said second detector rotated through 90° in a horizontal plane.

* * * * *